US007685138B2

(12) United States Patent
Beyer et al.

(10) Patent No.: US 7,685,138 B2
(45) Date of Patent: Mar. 23, 2010

(54) VIRTUAL CURSORS FOR XML JOINS

(75) Inventors: Kevin S. Beyer, San Jose, CA (US); Marcus Felipe Fontoura, Los Gatos, CA (US); Sridhar Rajagopalan, Fremont, CA (US); Eugene J. Shekita, San Jose, CA (US); Beverly Yang, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 11/270,784

(22) Filed: Nov. 8, 2005

(65) Prior Publication Data

US 2007/0112813 A1    May 17, 2007

(51) Int. Cl.
  *G06F 17/30* (2006.01)
  *G06F 7/00* (2006.01)
(52) U.S. Cl. ...................... 707/100; 715/234
(58) Field of Classification Search ............... None
  See application file for complete search history.

(56) References Cited

U.S. PATENT DOCUMENTS

| 6,738,759 | B1 * | 5/2004 | Wheeler et al. ............. 707/3 |
| 6,799,184 | B2 * | 9/2004 | Bhatt et al. ............. 707/102 |
| 7,139,746 | B2 * | 11/2006 | Shin et al. ............. 707/2 |
| 7,219,091 | B1 * | 5/2007 | Bruno et al. ............. 707/3 |
| 7,370,061 | B2 * | 5/2008 | Chakraborty et al. ....... 707/102 |
| 2005/0114314 | A1 * | 5/2005 | Fan et al. ............. 707/3 |
| 2005/0228791 | A1 * | 10/2005 | Thusoo et al. ............. 707/6 |
| 2006/0053122 | A1 * | 3/2006 | Korn et al. ............. 707/100 |

OTHER PUBLICATIONS

Bruno et al. Holistic Twig Joins: Optimal XML Pattern Matching ACM SIGMOD 'Jun. 4-6, 2002, Madison, Wisconsin, USA.*
Josifovski et al. Optimizing Cursor Movement in Holistic Twig Joins CIKM'05, Oct. 31-Nov. 5, 2005, Bremen, Germany.*
Al-Khalifa et al. Structural Joins: A Primitive for Efficient XML Query Pattern Matching In Proc. ICDE 2002.*
Beyer et alo Storing and Querying Ordered XML Using a Relational Database System. ACM SIGMOD'2002, Jun. 4-6, Madison, Wisconsin, USA.*

(Continued)

*Primary Examiner*—Pierre M Vital
*Assistant Examiner*—Berhanu Mitiku
(74) *Attorney, Agent, or Firm*—Oppenheimer Wolff & Donnelly LLP

(57) ABSTRACT

A system, method, and computer program product to improve XML query processing efficiency with virtual cursors. Structural joins are a fundamental operation in XML query processing, and substantial work exists on index-based algorithms for executing them. Two well-known index features—path indices and ancestor information—are combined in a novel way to replace at least some of the physical index cursors in a structural join with virtual cursors. The position of a virtual cursor is derived from the path and ancestor information of a physical cursor. Virtual cursors can be easily incorporated into existing structural join algorithms. By eliminating index I/O and the processing cost of handling physical inverted lists, virtual cursors can improve the performance of holistic path queries by an order of magnitude or more.

12 Claims, 16 Drawing Sheets

OTHER PUBLICATIONS

Yang et al. "Virtual Cursors for XML Joins" Yang et al. "Virtual Cursors for XML Joins" Association for Computing Machinery, Inc. CIKM 2004:Proceedings of the thirteenth ACM conference on information New York: ACM Press, c2004, Jun. 25, 2004.*

Yang et al. "Virtual Cursors for XML Joins" Association for Computing Machinery, Inc., CIKM 2004: Proceedings of the thirteenth ACM conference on information, New York: ACM Press, c2004 Jun. 25, 2004.*

* cited by examiner

FIG. 1 article
 └── section
      ├── title = 'Query Processing'
      └── figure
           └── caption = 'XML'

FIG. 3

| Path | Path ID |
|---|---|
| R | 1 |
| R–A | 2 |
| R–A–B | 3 |
| R–A–B–A | 4 |
| R–A–B–A–C | 5 |
| R–A–B–A–B | 6 |
| R–B | 7 |
| R–B–C | 8 |
| R–A–B–C | 9 |

FIG. 6

| Tag | Size |
|---|---|
| {A, B, C, D} | 1.1 M |
| E | 100K |
| F | 10K |
| G | 1K |

VIRTUAL CURSORS FOR XML JOINS

CROSS-REFERENCE TO RELATED APPLICATIONS

This invention is related to the following commonly-owned pending U.S. patent application, which is hereby incorporated by reference:

U.S. Ser. No. 10/655,126, filed Sep. 5, 2003, published Mar. 10, 2005 as US2005/0055336A1, entitled "Providing XML Cursor Support on an XML Repository Built on Top of a Relational Database System".

The invention is also related to the following article by the inventors, which is hereby incorporated by reference:

Virtual Cursors for XML Joins, Proceedings of the 13$^{th}$ ACM Conference on Information and Knowledge Management (CIKM 2004), Washington D.C., p. 523-532, 2004.

FIELD OF THE INVENTION

This invention relates to XML query processing and more specifically to replacing one or more of the physical index cursors in a structural join with virtual cursors by combining two well-known index features: path indices and ancestor information.

BACKGROUND OF THE INVENTION

The following prior art references are cited numerically in this application:

[1] S. Al-Khalifa, H. Jagadish, N. Koudas, J. Patel, D. Srivastava, and Y. Wu. Structural joins: A primitive for efficient xml query pattern matching. Proceedings of the 18th International Conference on Data Engineering (ICDE 2002), p. 141.

[2] J. Bremer and M. Gertz. On distributing xml repositories. International Workshop on Web and Databases (WebDB), Jun. 12-13, 2003, San Diego, Calif.

[3] N. Bruno, N. Koudas, and D. Srivastava. Holistic twig joins: Optimal xml pattern matching. Proceedings of the 2002 ACM SIGMOD International Conference on Management of Data, p. 310-321.

[4] S. Chien, Z. Vagena, O. Zhang, V. Tsotras, and C. Zaniolo. Efficient structural joins on indexed xml documents. Proceedings of the 28$^{th}$ International Conference on Very Large Databases (VLDB), p. 263-274, 2002.

[5] World Wide Web Consortium. Xquery 1.0: An xml query language, August 2001. <http://www.w3.org/TR/xquery/.>

[6] Reference deleted

[7] Marcus Fontoura, Jason Zien, Eugene Shekita, Sridhar Rajagopalan, and Andreas Neumann. High performance index build algorithms for intranet search engines. Proceedings of the 30$^{th}$ International Conference on Very Large Databases (VLDB), p. 245-256, 2004.

[8] H. Garcia-Molina, J. Ullman, and J. Widom. Database System Implementation. Prentice Hall, 2000.

[9] K. Goldman and J. Widom. Dataguides: enabling query formulation and optimization in semistructured databases. Proceedings of the 23rd International Conference on Very Large Databases (VLDB), p. 436-445, 1997.

[10] G. Salton and M. J. McGill. Introduction to modern information retrieval. McGraw-Hill, 1983.

[11] L. Gun, F. Shao, C. Botev, and J. Shanmugasundaram. Xrank: Ranked keyword search over xml documents. Proceedings of the 2003 ACM SIGMOD International Conference on Management of Data, p. 16-27.

[12] H. Jiang, H. Lu, W. Wang, and B. C. Ooi. Xr-tree: Indexing xml data for efficient structural join. Proceedings of the 19th International Conference on Data Engineering (ICDE 2003), p. 253-263.

[13] H. Jiang, W. Wang, and H. Lu. Efficient processing of xml twig queries with or-predicates. Proceedings of the 2004 ACM SIGMOD International Conference on Management of Data, p. 59-70.

[14] H. Jiang, W. Wang, H. Lu, and J. Yu. Holistic twig joins on indexed xml documents. Proceedings of the 29$^{th}$ International Conference on Very Large Databases (VLDB), p. 273-284, 2003.

[15] R. Kaushik, P. Bohannon, J. Naughton, and H. F. Korth. Covering indexes for branching path queries. Proceedings of the 2002 ACM SIGMOD International Conference on Management of Data, p. 133-144.

[16] R. Kaushik, P. Bohannon, J. Naughton, and P. Shanoy. Updates for structure indexes. Proceedings of the 28$^{th}$ International Conference on Very Large Databases (VLDB), p. 239-250, 2002.

[17] R. Kaushik, R. Krishnamurthy, J. Naughton, and R. Ramakrishnan. On the integration of structure indexes and inverted lists. Proceedings of the 2004 ACM SIGMOD International Conference on Management of Data, p. 779-790.

[18] T. Milo and D. Suciu. Index structures for path expressions. Proceeding of the 7$^{th}$ International Conference on Database Theory, 1999, p. 277-295.

[19] M. Olson, K, Bostic, and M. Seltzer. Berkeley DB. Proceedings of the USENIX 1999 Annual Technical Conference, June 1999.

[20] I. Tatarinov, S. Viglas, K. Beyer, J. Shanmugasundaram, E. Shekita, and C. Zhang. Storing and querying ordered xml using a relational dbms. Proceedings of the 2002 ACM SIGMOD International Conference on Management of Data, p. 204-215.

[21] H. Wang, S. Park, W. Fan, and P. Yu. ViST: A dynamic index method for querying xml data by tree structures. Proceedings of the 2003 ACM SIGMOD International Conference on Management of Data, p. 110-121.

[22] Xmark: The xml benchmark project. <http://monetdb-.cwi.nl/xml/index.html.>

[23] C. Zhang, J. Naughton, D. DeWitt, Q. Luo, and G. Lohman. On supporting containment queries in relational database management systems. ACM SIGMOD Record, v. 30, issue 2, June 2001, p. 425-436.

In recent years, XML has become the standard format for data exchange across business applications. Its widespread use has sparked a large amount of research, focused on providing efficient query processing over large XML repositories. Processing XML queries has proven to be challenging, due to the semi-structured nature of the data and the flexible query capabilities offered by languages such as XQuery [5].

XML queries often include both value and structural constraints. For example, the XQuery expression:

//article//section[

//title contains('Query Processing') AND

//figure//caption contains('XML')]

returns all article sections that are titled "Query Processing" and have a figure containing the caption "XML". We can represent this query with the node-labeled tree shown in FIG. 1. Nodes are labeled with element tags and text values. In this query, the structural predicate spans five elements and multiple text values in a complex twig pattern.

Structural joins are a core operation for any XML query processor and typically account for the bulk of the query processing cost [1]. As a result, a large body work has focused on efficient algorithms to process binary structural joins [1, 4, 23], and more recently, holistic path/twig joins [3, 14]. These algorithms are all index-based, relying on an inverted index for positional information about elements, and cursors are used to access the inverted index.

XML data is commonly modeled by a tree structure, where nodes represent elements, attributes and text data, and parent child edges represent nesting between elements. Elements and text values are associated with a position in the document. Most existing XML query processing algorithms rely on begin/end/level positional encoding (or BEL), which represents each element with a tuple (begin, end, level) based on its position in the tree. Another less-used alternative is Dewey encoding (e.g., [11, 20]), defined as follows: If we assign to each element a value that is the element's order among its siblings, then the Dewey location of element e is the vector of values of all elements on the path from root to e, inclusive. With both BEL and Dewey encoding, structural relationships between two elements can be easily determined given their positions [20]. FIG. 2 illustrates both encodings over a sample XML document.

Structural predicates can also be viewed as a tree, where the label of each "query node" is defined by the element tag or text value represented by the node. Path queries (e.g., "//a//b//c") and binary structural predicates (e.g., "a//b") are degenerate cases of the general twig pattern of structural predicates. An XML database is simply a collection of XML documents. As stated in [3], matching a structural predicate against an XML database is to find all distinct occurrences of the tree pattern in the database. A match for a pattern Q over database D is a mapping from nodes in Q to nodes in D such that both structural and value-based predicates are satisfied. The answer to Q, where Q has n nodes, can be represented as an n-ary relation where each tuple $(d_1, d_2, \ldots, d_n)$ consists of the database node IDs that identify a distinct match of Q in D.

Inverted Indices Index-based approaches to evaluating structural queries in XML (e.g., [4, 12, 14]) are based on an index over the positions of all elements in the database. By far the most common implementation of this index is an inverted index [10], which is frequently used in information retrieval and XML systems alike (e.g., [1, 3, 4]).

Briefly, an inverted index consists of one posting list per distinct token in the dataset, where a token may represent a text value or element tag. Each posting list is a sorted list of postings with format (Pos,Data). There is one posting per occurrence of the token in the dataset. Pos represents the position of the element occurrence, and Data holds some user-defined data, which for now we assume is empty. The list is sorted by Pos. Stepping through each posting in a list will provide us with the positions of every element (or text value) with a given tag in the dataset, in order of appearance. As with most IR systems, we assume each posting list is indexed, typically with a B-tree, such that searching for a particular position in the posting list is efficient.

Each node q in a twig pattern is associated with an element tag or text value; hence each node is associated with exactly one posting list in the inverted index. To process a structural predicate, we retrieve and scan one posting list per node. For example, to process the query shown in FIG. 1, we need eight posting lists—five for each query node representing an element, and three for query nodes representing text values (the 'Query' and 'Processing' text values each have their own posting list). We call the current position of the scan operator the cursor over the posting list. In particular, we will use Cq to denote the cursor over the posting list of query node q.

Performing a structural join involves moving these cursors in a coordinated way to meet the ancestor-descendent and parent-child constraints imposed by the query. Three basic operations over the cursors are required for the majority of index-based structural join algorithms [14]:

advance( )—advances the cursor to the next position in the posting list.

fwdBeyond(Position p)—advances the cursor to the first element whose position is greater than or equal to p.

fwdToAnc(Position p)—advances the cursor to the first ancestor of p at or following the current cursor position, and returns TRUE. If no such ancestor exists, it stops at the first element e that has a greater position than p, and returns FALSE.

To maintain optimality bounds of existing algorithms, cursors may only move forwards, never backwards. Note that indices (e.g., a B-tree) are required over posting lists to efficiently implement fwdBeyond( ) and fwdToAnc( ); again, such indices over the posting lists are common.

Path Index A path index is a structural summary of the XML dataset (e.g., [9, 15]). In its simplest conceptual form, a path index is a list of (path, pathID) entries, where there exists one entry per unique path in the dataset. Each path is assigned a unique path ID (or PID). FIG. 3 shows the path index for the dataset modeled in FIG. 2.

We say a PID qualifies for a given pattern if the associated path matches this pattern. Over the path index, we define the function GetQualifyingIDs:path pattern→{PID}, which maps a path pattern to the set of qualifying PIDs. For example, over the path index in FIG. 3, a call to GetQualifyingIDs("//R//B") will return the set {3, 6, 7}. The actual implementation of GetQualifyingIDs( ) is fairly straightforward and is covered nicely in [17].

Given a path index, every position in the inverted index is now associated with a PID. Again, we refer readers to [17] for a discussion on how to integrate PIDs into the inverted index and use them during query processing. In brief, every posting in the index contains the PID of the corresponding element. Integration of PIDs into the index incurs an overhead on index size and build time, addressed below.

Ancestor Information With ancestor information, we can efficiently obtain the ancestors of any given element. There are many possible approaches to augmenting the index with ancestor information. One elegant approach is to use Dewey position encoding, rather than the popular BEL encoding. As illustrated in FIG. 2, the Dewey positions of all ancestors of an element are encoded in the prefixes of that element's position. In contrast, although BEL encoding allows us to easily determine whether a given element is an ancestor of another given element, it does not allow us to immediately produce the positions of all ancestors given a single element. We note that other encodings such as [2] also provide ancestor information; we use Dewey encoding for its relative simplicity and popularity compared to these other approaches.

The problem of exploiting indices to enhance XML join algorithms has been studied in [4, 12, 14, 17, 21]. Reference [21] presents the ViST index structure and algorithms for twig join processing via subsequence matching.

References [4, 12] use indices over postings lists to speed up processing of binary structural joins. They use B-trees to speed up the location of descendants of a given element, and [12] uses a specialized XR-tree to speed up the location of ancestors. Also, the specialized XR-tree index structure only provides partial ancestor information: given an element tag T and an element e, it returns all ancestors of e with the tag T.

Reference [14] presents an improved holistic twig join algorithm over [3] that exploits indices (such as B-trees).

Reference [17] introduced the problem of integrating inverted indices and path indices to answer XML joins.

SUMMARY OF THE INVENTION

It is an object of this invention to provide a method, system, and program product to increase XML query processing efficiency via virtual cursors. Two well-known index features, path indices and ancestor information, are combined in a novel way to replace one or more of the physical index cursors in a structural join with virtual cursors. Unlike a physical cursor, the movement of a virtual cursor never triggers index I/O; its position is derived from the path and ancestor information of a physical cursor.

Virtual cursors can be easily incorporated into existing algorithms for structural joins, and by eliminating index I/O operations, virtual cursors can improve the performance of structural joins by an order of magnitude or more. The overhead of adding path indices and ancestor information is easily subsumed by the advantages of virtual cursors in most scenarios. Experimental results are provided to illustrate these assertions.

Every "useful" element position of cursor Cq, where q is any non-leaf (or internal) query node, is the ancestor of some cursor Cl, where l is a leaf node. A "useful" element is one that is either used in a solution, or that was necessary to inspect in order to correctly process the join. Any algorithm running over the unmodified dataset thus does not need to inspect any Q elements lacking L descendants, in order to return the correct result set. The invention capitalizes on this observation and therefore avoids scanning postings for all "internal" (non-leaf) posting lists, increasing efficiency of join processing.

The foregoing objects are believed to be satisfied by the embodiments of the present invention as described below.

BRIEF DESCRIPTION OF THE DRAWINGS

FIG. 1 is a node-labeled tree representing an exemplary query.

FIG. 3 is a diagram of the path index for the dataset modeled in FIG. 2.

FIG. 6 is a table of posting list sizes for the exemplary dataset of FIG. 5.

DETAILED DESCRIPTION OF THE INVENTION

Figure 2:
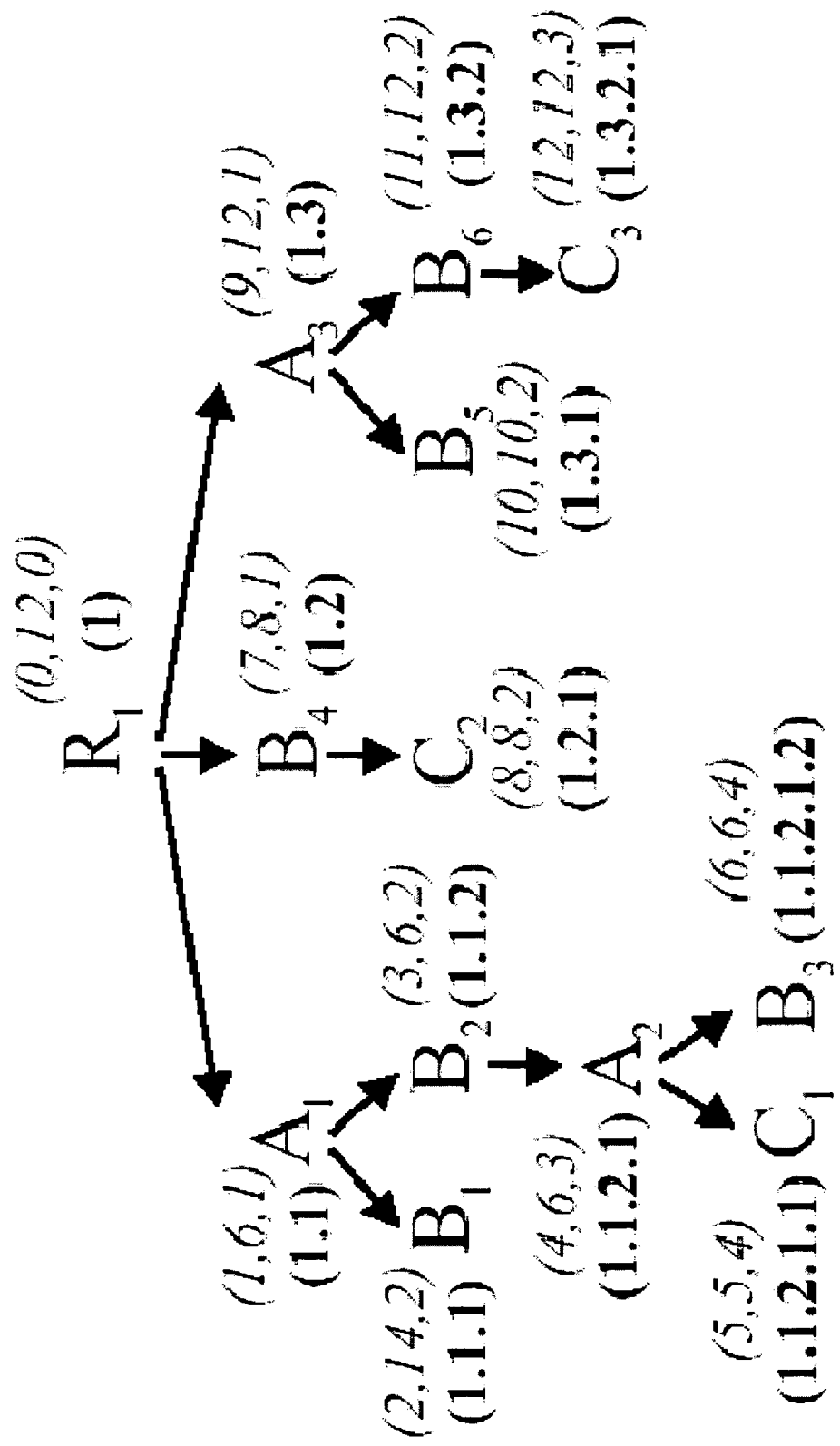
FIG. 2 is a diagram illustrating BEL and Dewey encodings over a sample XML document.

This application provides:

A description of virtual cursors and how they can be easily incorporated into existing algorithms for structural joins.

Experimental results showing that, by eliminating index I/O, virtual cursors can improve the performance of structural joins by an order of magnitude or more.

Experimental results showing that the overhead of adding path indices and ancestor information is easily subsumed by the advantages of virtual cursors in most scenarios.

This work has been done in the context of the Trevi intranet search engine [7], a prototype used within IBM for all queries on its world-wide intranet. However, the invention is not limited to this application.

We present virtual cursor algorithms, an implementation of the cursor interface that allows us to avoid scanning postings for all "internal" (non-leaf) posting lists. The key to virtual cursors is exploiting the complementary strengths of both path indices and ancestor information.

4.1 Algorithm

We begin by making the following observation of the existing structural join algorithms in the literature:

OBSERVATION 1. Every "useful" element position of cursor Cq, where q is any non-leaf (or internal) query node, is the ancestor of some cursor Cl, where l is a leaf node.

A "useful" element is one that is either used in a solution, or that was necessary to inspect in order to correctly process the join. The intuition for the above observation can be explained as follows: from a given dataset, say we removed all elements with label Q that had no descendants with label L. Any query in which L appears as a descendant of Q should return the same result set in the modified dataset as in the unmodified dataset. We can thus conclude that any algorithm running over the unmodified dataset does not need to inspect any Q elements lacking L descendants, in order to return the correct result set.

Given the above observation, it follows that if we can determine all ancestor positions of a given element by inspecting only that element, then to process the algorithms, we do not need to scan the posting lists for any internal query node. For example, in the query shown in FIG. 1, we do not need to touch the posting lists for any of the query nodes representing elements. This insight provides the basis for the virtual cursor—an implementation of the index operation that does not scan physical postings. These algorithms can be used in conjunction with existing join algorithms (e.g., [4, 14]), with minor modifications (Section 4.2). Cursors are modified to ignore all postings with non-qualifying PIDs, so that the actual number of postings handled by the join algorithm is greatly decreased.

Preliminaries The partial functionality of the specialized XR-tree index structure of [12] is insufficient for implementing the invention; therefore, new ways of implementing full ancestor information in the inverted index are designed, without using specialized structures. To provide full functionality for a virtual cursor, we need to implement the three operators described earlier: fwdBeyond( ), fwdToAnc( ), and advance( ). However, virtual cursors are only applicable to internal (non-leaf) query nodes, and structural join algorithms can be easily modified to never call fwdBeyond( ) on an internal query cursor; thus, we need only to consider fwdToAnc( ) and advance( ). We will call our algorithms for these functions VirtualFwdToAnc( ) and VirtualAdvance( ), respectively.

To implement virtual cursors, we need two important helper functions, GetAncestors: element→{element}, and GetLevels: (PID,token)→{level}. Function GetAncestors( ) takes as input an element position from the dataset, and returns all ancestor positions of the element. For example, over the dataset in FIG. 2, element $C_1$ has ancestors {R, $A_1$, $B_2$, $A_2$}. Thus, using Dewey encoding, calling GetAncestors (1.1.2.1.1) returns {1, 1.1, 1.1.2, 1.1.2.1}. It is easy to see how the values in the return set are simply all the prefixes of the original position, when Dewey encoding is used.

Although we now have the positions of all ancestors of a given element, we still need to know which of these positions are relevant to a cursor. For example, to implement a cursor associated with token "A", only A elements are relevant. Function GetLevels( ) addresses this need by returning the levels, or depths, of the ancestors that match a given token. For example, using the sample path index in FIG. 3, GetLevels(5, "A") returns {2, 4}. Since element 1.1.2.1.1 from FIG. 2 has PID 5, we know that ancestors {1.1} and {1.1.2.1} have tag A. Function GetLevels(pid, token) can be efficiently implemented over the path index in time O(d), where d is the length of the path represented by ID pid. We also note that at a system-wide level, GetLevels( ) needs to be performed just once for a given PID and token; the results can then be saved (e.g., in a hash table) and reused for future queries.

Finally, we associate state with a given cursor C. Each cursor C is associated with a token (e.g., the element tag "A"), an element position pcur that represents the current position of the cursor, and an element position pdesc that represents the last position passed in to the call VirtualFwdToAnc( ). The definitions of these variables become more clear when we present our algorithms.

Algorithm 1 VirtualFwdToAnc(p)
Input: Element position p of descendant cursor
Cursor C on which function is called (implicit)
Output: First ancestor pa of p in the posting list such that pa is greater than or equal to the current cursor position, if such an element exists

```
1:    C.pdesc = p;
2:    AncArray = GetAncestors(p);
3:    LevelArray = GetLevels(p.PID, C.token);
4:    for i=1:length(AncArray) do
5:        if AncArray[i] < C.pcur then
6:            continue;
7:        if i ∉ LevelArray then
8:            continue;
9:        C.pcur = AncArray[i];
10:       return C.pcur
```

-continued

```
11:   end for
12:   C.pcur = invalidPosition;
13:   return C.pcur;
```

Function VirtualAdvance( )
Input: Cursor C on which function is called (implicit)
Output: Next useful element in this posting list
  1: return VirtualFwdToAnc(C.pdesc);

Virtual Cursor The algorithm for VirtualFwdToAnc( ) works as follows: First, given an element position p of a child query node, we retrieve the ancestor positions of p (line 2) and the levels at which the relevant ancestors appear (line 3). We then find the first ancestor position pa for which the following conditions hold: (1) pa≧pcur, where pcur is the current element position of this cursor, and (2) pa is "relevant" to the cursor, meaning pa has the appropriate tag or text value.

The first condition (enforced by lines 5-6) is necessary given our requirement that cursors never move backwards; otherwise, we may lose optimality properties of the join algorithms. The second condition (enforced in lines 7-8) holds if the depth of pa, determined by its index into AncArray, appears in the array LevelArray of relevant levels. If such an element position pa is found in AncArray, then we know it is a relevant, useful ancestor of p that the calling join algorithm has not yet seen. Hence, pcur is set to pa. Upon returning from the call, the cursor is defined to be pointing to pcur. Note also that at line 1, we set pdesc=p, which will be used in VirtualAdvance( ) described below.

EXAMPLE 1

Figure 4:
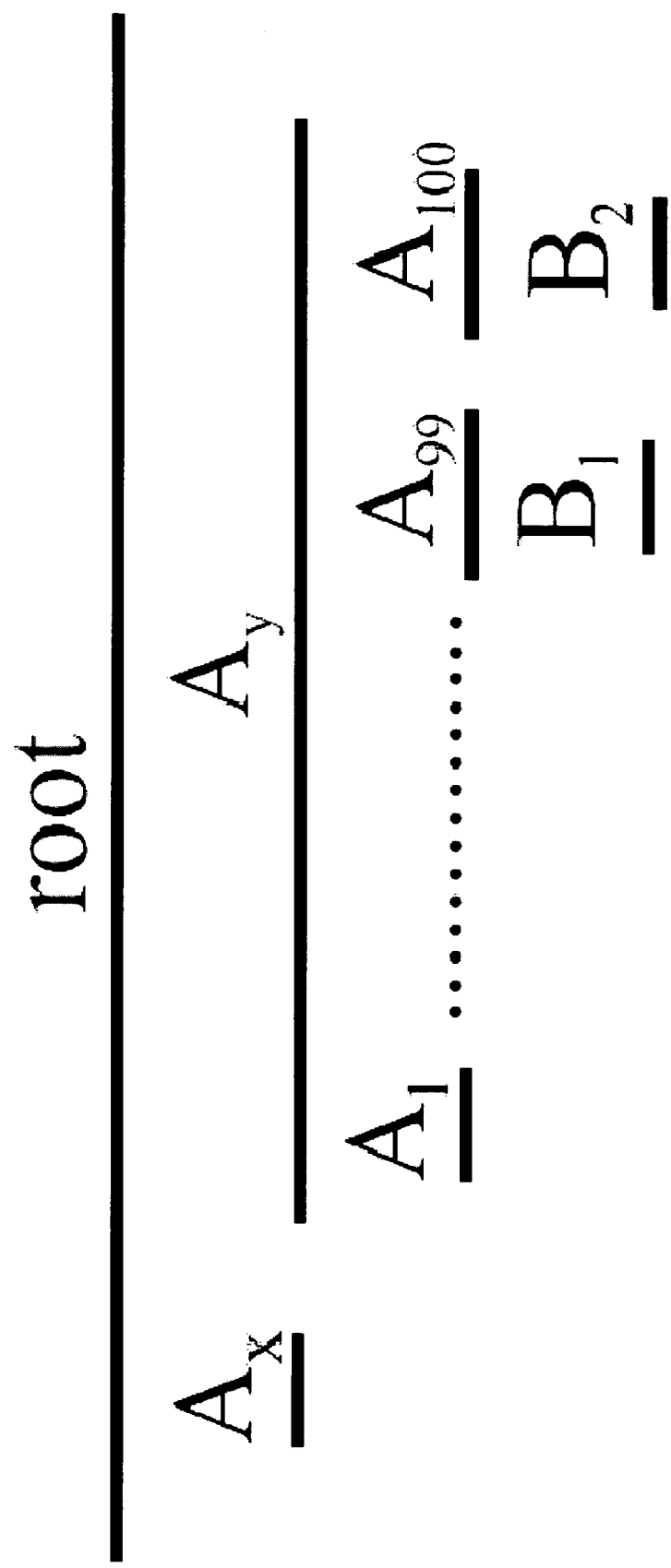
FIG. 4 is a diagram of a dataset, according to an embodiment of the present invention.

Consider the dataset in FIG. 4, and the call $C_A$→VirtualFwdToAnc($B_1$). Before VirtualFwdToAnc is called for the first time in a query, pcur is initialized to a special position POS_ZERO, which is defined to be less than all other positions in the database.

When the function is called, GetAncestors($B_1$) will return the set {Root, $A_Y$, $A_{99}$}. Say $B_1$ has path ID x, representing the path pattern "Root-A-A-B". In this case, GetLevels(x, "A") will return the set {2, 3}, since only the ancestors at depths 2 and 3 have label A. When i=1 (AncArray[i]=Root) the first condition holds (Root>pcur) but the second condition does not (i∉LevelArray). When i=2, both conditions hold. Thus, pcur is set to $A_Y$, the correct first ancestor of element $B_1$.

Now let us consider the VirtualAdvance( ) algorithm, which is simply an invocation of VirtualFwdToAnc(pdesc). Intuitively, this algorithm results in incorrect behavior. For example, say after the first call to $C_A$→VirtualFwdToAnc ($B_1$), we call $C_A$→VirtualAdvance( ). The definition of advance( ) requires that we return element $A_1$, but VirtualAdvance( ) will return $A_{99}$. However, this is where Observation 1 becomes important: because element $A_1$ is not useful, any structural or holistic join algorithm does not need to know of its existence. Returning $A_{99}$, the first useful element following $A_Y$, will result in correct join behavior. We therefore modify the definition of advance( ) to return the next useful position following the current cursor position.

What happens in VirtualFwdToAnc( ) if no ancestor exists for an element position p? In order to maintain correctness, the cursor must point to a position p' such that: (1) p'>p, and (2) p'<x for all real elements x such that x>p. However, since VirtualFwdToAnc( ) only has knowledge of elements that are ancestors of p, and p' is necessarily not an ancestor of p, we must define an "imaginary" invalid position that is defined to satisfy these properties (line 12).

For example, say we call $C_A \rightarrow$ VirtualAdvance( ) after the previous call to VirtualFwdToAnc(B1) returns $A_{99}$. This call should return $A_{100}$, which is a useful element. However, since $A_{100}$ is not an ancestor of $B_1$, VirtualFwdToAnc( ) does not know of the existence of $A_{100}$, until the function is called with $B_2$ as input. Instead, using Dewey notation, since the position of $B_1$ is 2.99.1, we set pcur to the invalid position 2.99.1%.½. This position is invalid because ½ is not a valid Dewey component (by definition, all components in a Dewey expression are integers). However, it satisfies the constraints that it is larger than $B_1$, and yet smaller than all valid elements that follow $B_1$. Thus, it maintains the correctness of the join algorithms calling it.

We note that the above algorithms are shown in the most conceptually clear way, but an actual implementation can be optimized.

4.2 Modification to Holistic Join

To incorporate virtual cursors into the latest holistic join algorithms [13, 14], we must make a simple modification to the LocateExtension subroutine defined in these algorithms. We refer readers to the citations for more details on how this subroutine fits in with the overall join algorithm. However, all necessary details to understand this subroutine are contained in this section.

The subroutine LocateExtension(q) finds the first solution, or "extension," to the subquery rooted at q, in the document following the current cursor positions. For example, consider the query "//a//b//c" over the dataset shown in FIG. 2. Say the current cursor positions are $(A_2, B_2, C_1)$. A call to LocateExtension(B) will forward $C_B$ to $B_4$ and $C_C$ to $G_2$, since these elements represent the first solution to the subquery "//b//c" following the current cursor positions. A call to LocateExtension(A) will forward $C_A$ to $A_3$, $C_B$ to $B_6$ and $C_C$ to $C_3$, since these elements represent the first solution to the subquery "//a//b//c" following current cursor positions.

```
Algorithm 2 LocateExtension(q)
1:   while (not end(q)) and (not hasExtension(q)) do
2:       (p,c) = PickBrokenEdge(q);
3:       ZigZagJoin(p,c);
4:   end while
Function hasExtension(q)
1:   for each edge (p,c) in the sub query tree q do
2:       if isBroken(p,c) then
3:           return FALSE;
4:   end for
5:   return TRUE;
Procedure ZigZagJoin(p,c)
1:   while (not end(Cp)) and (not end(Cc))
         and (not contains(Cp,Cc)) do
2:       if Cp < Cc then
3:           Cp → fwdToAncestorOf(Cc);
4:       else
5:           Cp → fwdBeyond(Cp);
6:   end while
Procedure end(q)
1:   return ∀Aq ∈ subtreeNodes(q) : isLeaf(q_i) => end(Cq_i));
```

The original algorithm for LocateExtension is shown in Algorithm 2. LocateExtension works by repeatedly selecting and fixing "broken" edges, until no edges are broken, which by definition means we have found an extension. An edge $\{q1, q2\}$ is broken if $C_{q1}$ does not contain $C_{q2}$—that is, not contains($C_{q1}, C_{q2}$). Different strategies may be used to select a broken edge; this problem is studied in [14]. To fix a broken edge, LocateExtension performs a "zig-zag join," commonly used to join inverted lists in information retrieval [8]. As we can see, if PickBrokenEdge selects an edge such that c is an internal node, then ZigZagJoin may call fwdBeyond on the cursor for an internal node.

To modify LocateExtension so that it does not call fwdBeyond on an internal cursor, we observe that for an element corresponding to some query node q to appear in a solution, it must be contained by elements corresponding to all ancestors of q, in the proper order. For example, in query //a//b//c, for some C element to appear in a solution, it must have a B ancestor, which must in turn have an A ancestor.

Given this observation, our modifications to LocateExtension can be seen in Algorithm 3. First, instead of PickBrokenEdge, we substitute the function PickBrokenLeaf, which returns a leaf node l that does not have an unbroken path from q to leaf. We then find the maximum ancestor cursor Ca, and call Cl→fwdBeyond(Ca). Note that calling fwdBeyond on any of the ancestor cursors would be correct, but not as efficient. Finally, we "fix" the path from q to leaf by forwarding all ancestor cursors to positions that are ancestors of the current leaf node position. Because cursors only return positions with qualifying path IDs, we are guaranteed that such ancestors exist.

Although we cannot prove that our new LocateExtension is strictly more efficient than the original LocateExtension (or vice versa), in practice we find that the new LocateExtension is more efficient. The intuition behind this observation is that elements with qualifying path IDs are guaranteed to have all the necessary ancestors, but not all the necessary descendants. For example, consider again query "//a//b//c" over the dataset in FIG. 2. Say the cursors are currently pointing to elements $(A_2, B_3, C_1)$. Fixing edge (a, b) will leave the cursors pointing to elements $A_3$ and $B_5$, because both of these elements have qualifying path IDs. However, element $B_5$ does not have a C descendant. In contrast, fixing leaf c will automatically forward the cursors to the next solution, $(A_3, B_6, C_3)$, since $C_2$ does not have a qualifying PID and will therefore be skipped over.

```
Algorithm 3 LocateExtension(q) (with virtual cursors)

1: while (not end(q)) and (not hasExtension(q)) do
2:   l = PickBrokenLeaf(q);
3:   A = ancestors of l under subquery rooted at q;
4:   a_max = maxarg_{a∈A} {Ca};
5:   Cl → fwdBeyond(Ca_max);
6:   for each a in A
7:     Ca → VirtualFwdToAnc(Cl);
8: end while
```

4.3 Analytical Evaluation

Virtual cursors provide two main performance advantages. First, and most importantly, they allow us to avoid reading any postings from disk for all internal query nodes. Second, we can show the following result:

LEMMA 1. Excluding invalid positions, the number of values returned using a virtual cursor for any query node q is less than or equal to the number of values returned using a physical cursor.

The corollary to this lemma is that the number of instructions executed by the join algorithm, excluding the processing of invalid positions, is maintained or improved by the use of virtual cursors.

EXPERIMENTAL SETUP

Given the path index and ancestor information features, we now have a space of indexing alternatives to compare. The points in this space are as follows:

- Basic—The standard inverted index with B-tree indices over the posting lists, using BEL encoding
- Path—A Basic index integrated with PIDs
- Anc—A Basic index using Dewey encoding
- PathAnc—A Basic index using Dewey encoding, and integrated with PIDs
- VC—A PathAnc index, over which we use virtual cursors Under the Anc and PathAnc indexing alternatives, we use a modified algorithm of FindAncestors found in [12] to efficiently implement fwdToAnc using ancestor information. Note that PathAnc and VC represent the same physical index features, but different algorithms. An intuition of how the different index features affect query execution will be provided in Section 6.1.

We evaluate each indexing alternative primarily through running time, and when appropriate, number of elements scanned, index size and index build time. Running time is obtained for a given query by averaging the running time of several consecutive runs with cold buffers. Cold buffers ensure that we capture the I/O cost of processing the query in the running time. The number of element scans is the number of postings that are scanned in the posting lists. Build time is the time to construct a new inverted index from a tokenized input.

Our queries fall into three categories: Simple binary structural joins (using the algorithm in [4]), holistic path queries, and holistic twig queries (using the algorithm in [14]). Binary structural joins are most widely used in current XML database systems [1], while holistic path and twig joins have provably superior performance and are likely to become popular in the near future.

Testbed Our experimental testbed is built over the Berkeley DB [19] embedded database. Because compression and packing alternatives differ widely for Dewey and BEL encodings, to remain agnostic to these choices, our experiments comparing these two encodings do not compress or pack the data. Later in Section 6.3 we will explain this choice as worst case scenario for our virtual cursor technique. All experiments are run on a Linux Red Hat 8.0 workstation with a 2.2 GHz Intel Pentium 4 processor and 2 GB main memory. Note that while memory is large, all algorithms access posting lists in strictly sequential order. Therefore, our runtimes are representative of any memory buffer large enough to hold at least the internal pages of the B-tree and one leaf page per posting list.

Datasets For index size and build experiments, we use the XMark [22] benchmark dataset. For query evaluation, we choose to generate our own data in order to control the structure and join characteristics of the data. However, experiments were conducted over real-world and benchmark datasets (e.g., XMark) and we observed similar performance behavior, at the same relative orders of magnitude.

Figure 5:
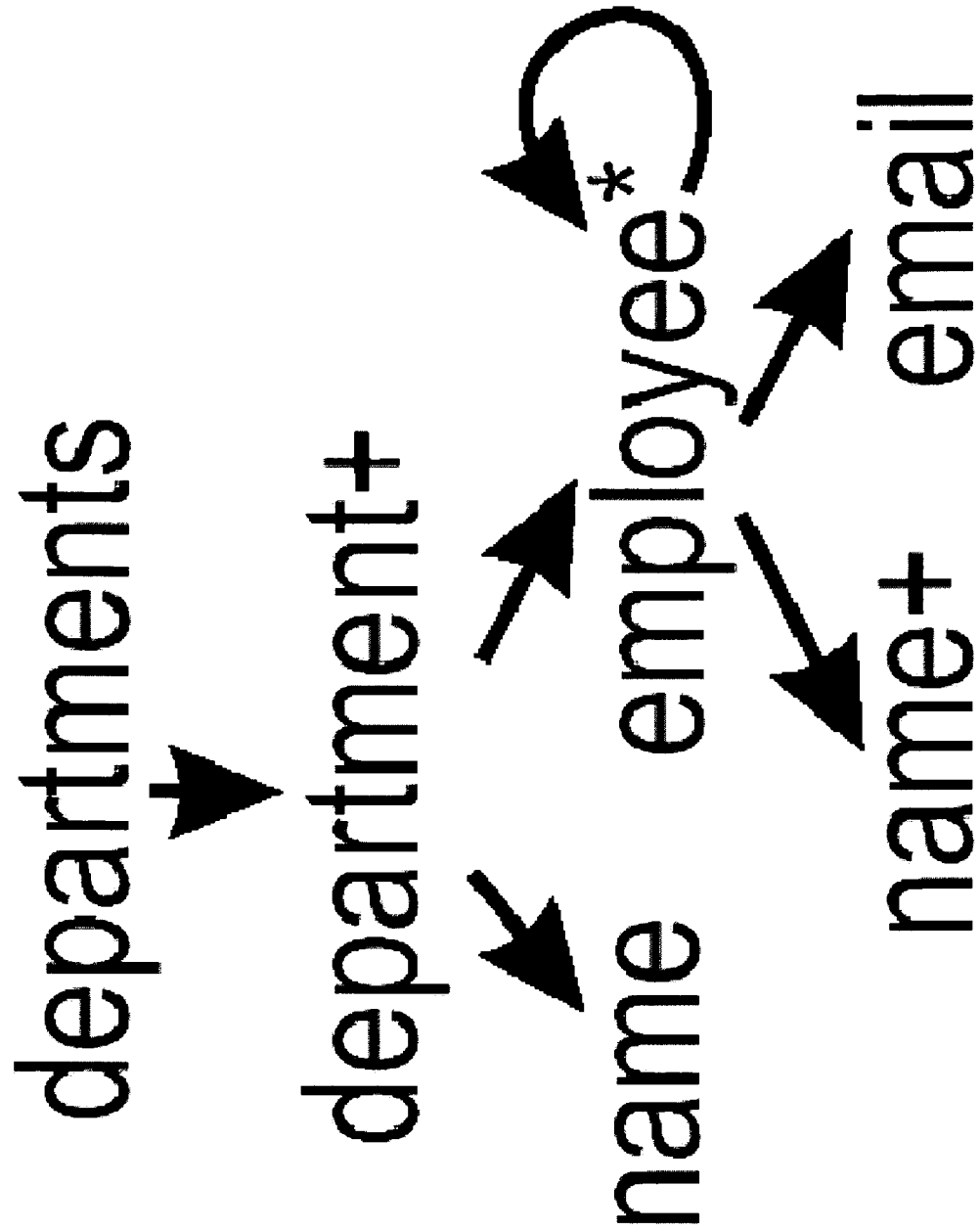
FIG. 5 is a diagram of a DTD used to generate an exemplary dataset.
Figure 6:
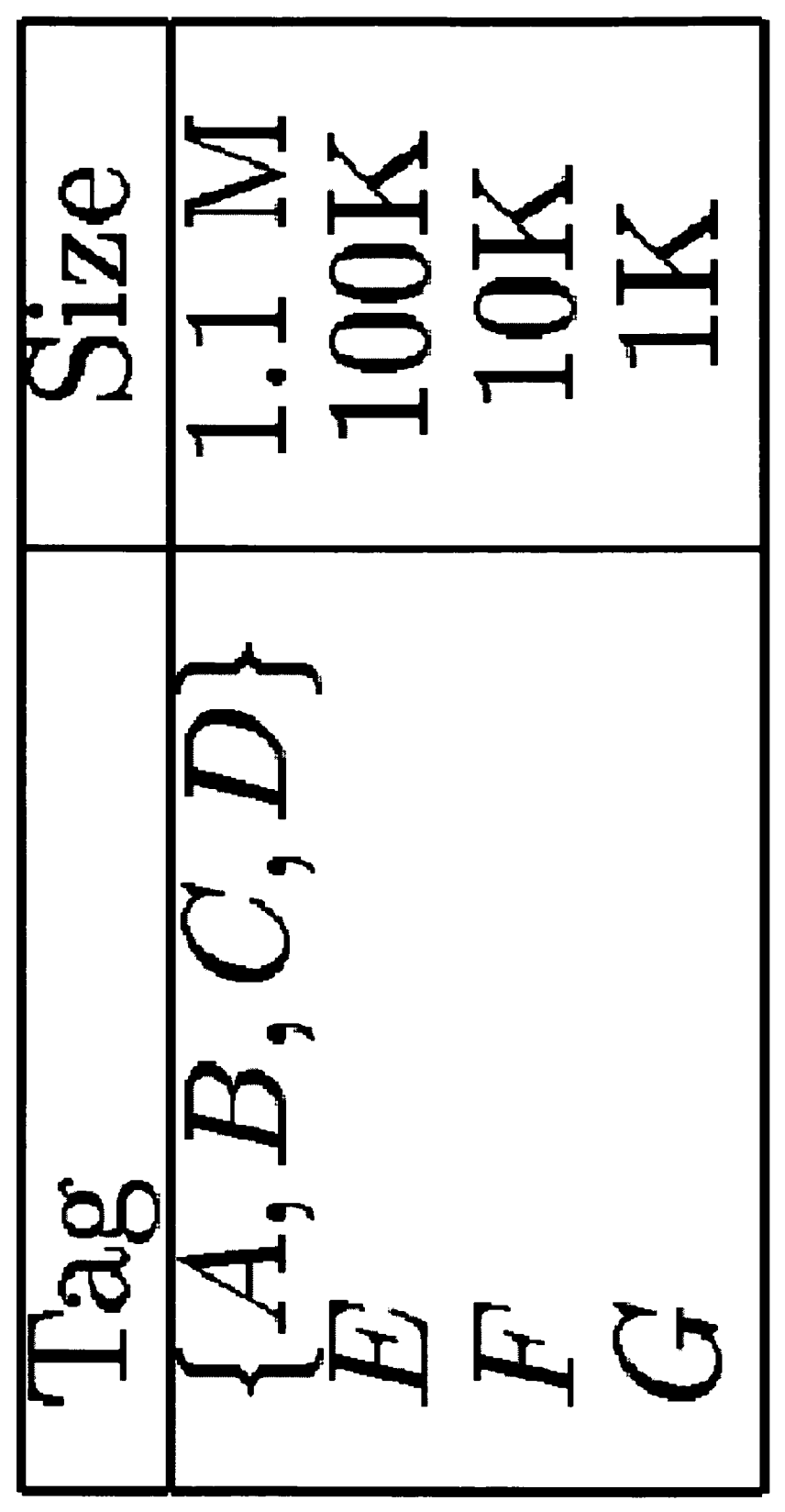

To evaluate binary structural joins, we use the same dataset used in [4, 12], generated according to the DTD in FIG. 5, with roughly 1 million name and 1 million employee elements. For holistic path and twig joins, we needed more complex document structure to study different aspects of join performance. For these, we use a dataset modeled after the one used in [14] to evaluate holistic twig join performance. In particular, our dataset consists of 7 element tags, whose posting list sizes are shown in FIG. 6. We vary the sizes of the join result (i.e., inverse selectivity) between elements as shown in Table 1. By selecting queries with varying patterns, join selectivity and element set frequency, we can study the performance of our algorithms with different query and data properties.

TABLE 1

| Join result sizes between element sets | |
|---|---|
| Join | Result Size |
| {A, B, C, D} → {A, B, C, D} | 500 K |
| {A, B, C, D} → E | 50 K |
| {A, B, C, D} → F | 5 K |
| {A, B, C, D} → G | 500 |
| E → {A, B, C, D} | 50 K |
| F → {A, B, C, D} | 5 K |
| G → {A, B, C, D} | 500 |

RESULTS

In this section, we demonstrate the effectiveness of virtual cursors over our prototype implementation. We also analyze the overhead of the index features that enable virtual cursors.

6.1 Binary Structural Joins

Figure 7:
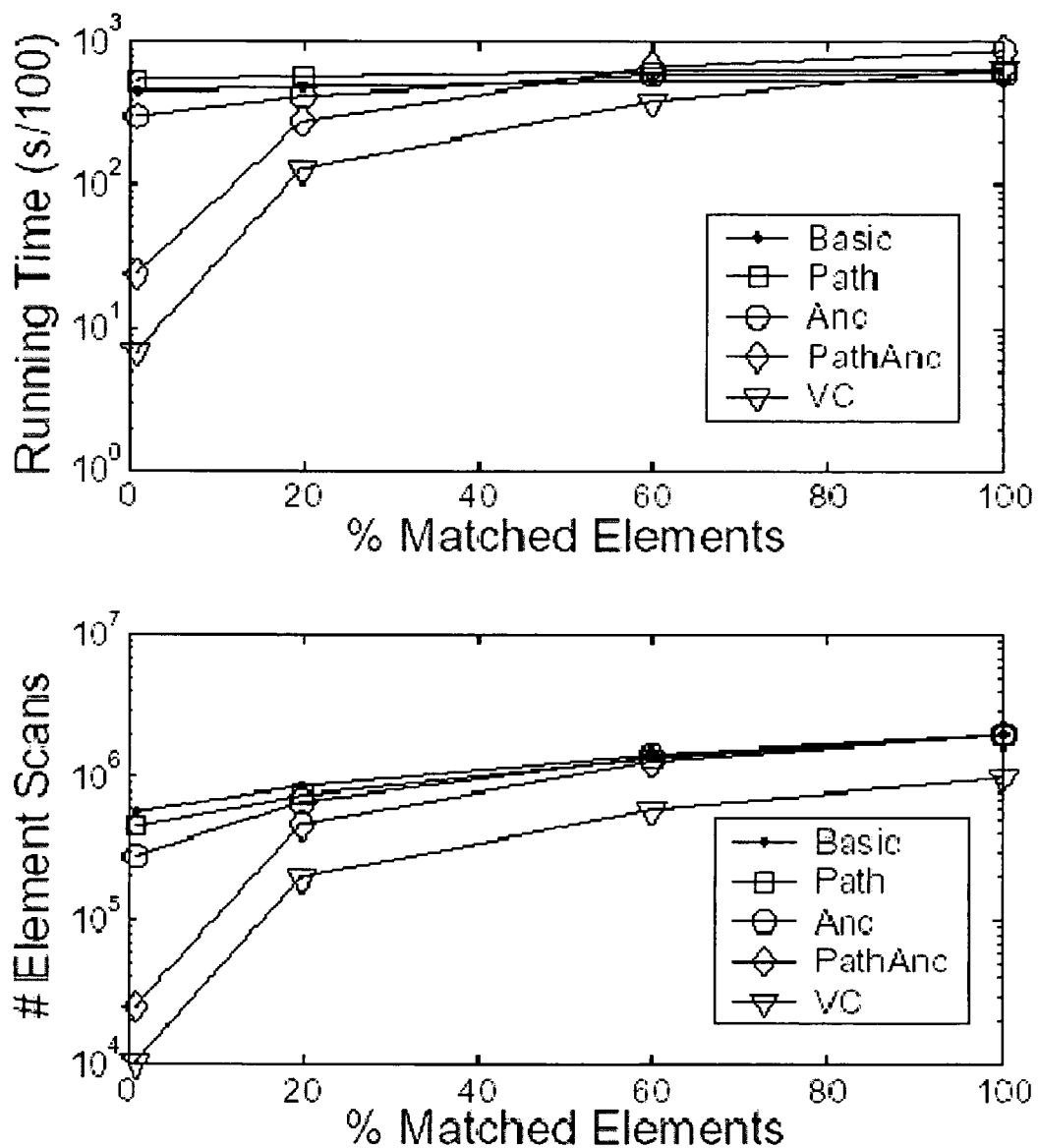
FIG. 7 is a diagram depicting the performance of a structural join between elements over the dataset generated from the DTD of FIG. 5, according to an embodiment of the present invention.

We begin by analyzing the simplest of all join types: binary structural joins. FIG. 7 shows the performance of a structural join between employee and name elements, over our dataset generated from the DTD in FIG. 5. Along the x-axis we vary the percentage of elements from each set that appear in a solution. To vary this percentage, we effectively start with the two lists of employee and name elements, and "disassemble" a matching pair by moving the descendant to outside the scope of the ancestor.

FIG. 7 reveals several basic insights that we will see repeated throughout all our experiments. First, we observe that when the percentage of matching elements is high, additional index features do indeed have a negative impact on running time performance, due to the fact that postings are larger, and therefore fewer postings fit per page. For example, at 100% matching elements, Anc performs the same number of element scans as Basic, but has running time that is 8% higher. At 100% matching elements, the structural join is essentially reduced to a full scan of the posting lists. Therefore Basic, which packs the most postings per page, has best performance. However, we believe most realistic structural joins will not have such a high percentage of matching elements.

Figure 10:
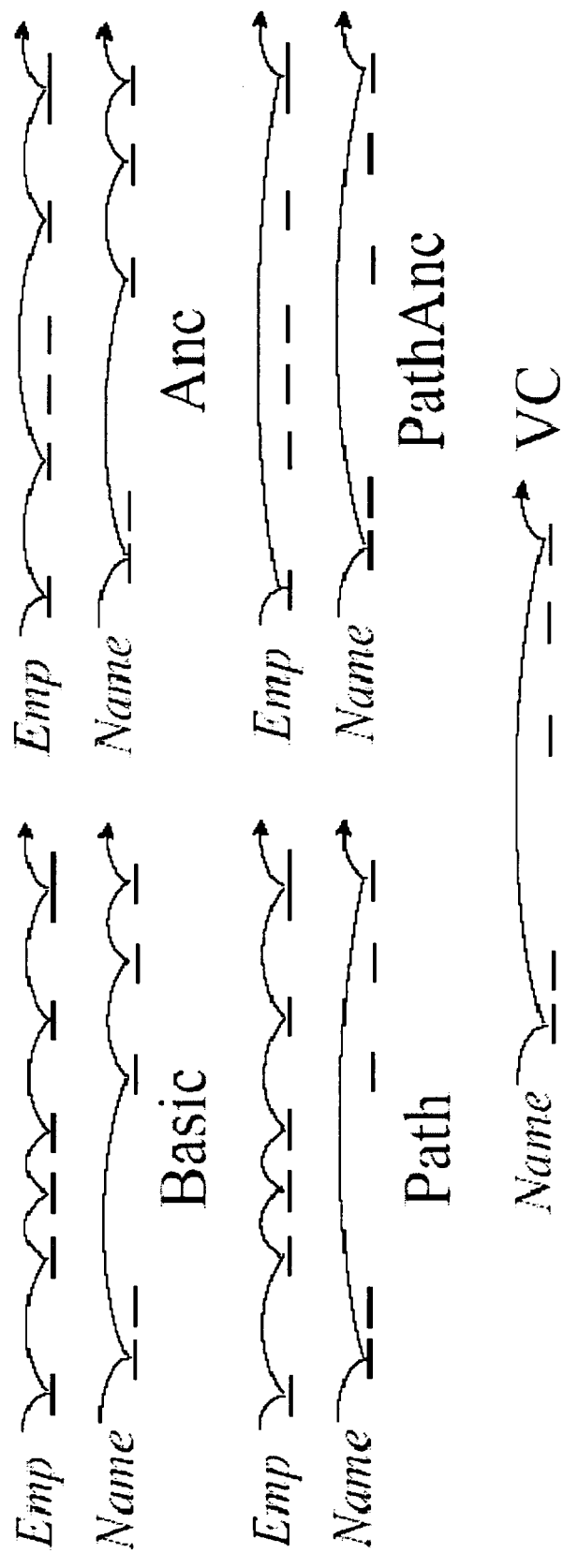
FIG. 10 is a diagram depicting how the different index features affect execution of the binary join, according to an embodiment of the present invention.

Next, observe that the Path and Anc features are only somewhat effective, but that the combination of the two, PathAnc, is much better. To understand this observation, FIG. 10 provides a brief intuition of how the different index features affect execution of the binary join. The Basic index accesses almost every element in the ancestor and descendent lists. Path is effective in skipping descendant elements with no matching ancestors, because such elements have non-qualifying PIDs. However, because Path cannot effectively skip ancestor elements, its overall performance is poor. Anc is effective in skipping ancestor elements, as observed in [12], or efficiently recognizing when no ancestor exists. However, because many name elements have no matching ancestor, many of the ancestor elements found are not actually useful.

Now, with the PathAnc combination, only useful ancestors and descendants are accessed. First, the join algorithm will use the Path feature to skip directly to a useful name element. Then, the algorithm will use Anc to skip directly to the (useful) ancestor of that element. Thus, we have the following result:

RESULT 1. Path and Anc may individually perform poorly, especially when the percentage of matching ancestor and descendant elements is low. In contrast, the PathAnc index feature only scans useful elements, greatly outperforming both Path and Anc. This result is important, as it shows the relationship between prior work and the pitfalls of using only path indices or only ancestor information. However, our question remains: can we exploit the complementary strengths of Anc and Path to perform even better than PathAnc?

Looking at the performance of our virtual cursor algorithm in FIG. 7, we can see that the answer is "yes". The virtual cursors algorithm consistently has best performance, by up to a factor of 3 over PathAnc, except at a very high percentage of matching elements. Because virtual cursors are based on the PathAnc feature set, it too is outperformed by Basic when 100% elements match; however, in this scenario virtual cursors still have better performance than regular PathAnc by 16%. Again, we refer to FIG. 10 for the intuition of this performance improvement. We can see that VC has the same good skipping performance as PathAnc on the descendant posting list, and does not need to access the ancestor posting list.

In the remainder of this section, we will investigate the factors that affect the effectiveness of virtual cursors. We will find that, although virtual cursors provide large performance gains for binary structural joins, they are even more advantageous in more complex joins.

6.2 Holistic Joins

In this section, we continue our analysis of index features over more complex queries, using the latest holistic join algorithms [14]. To this end, we select five query patterns to execute over our third dataset, representing path and twig queries:

(P1) $\delta$//E//D;

(P2) $\alpha$//A//B//C;

(P3) //A//B//C//$\alpha$;

(P4) $\alpha$//A[//B & //C];

(P5) //A//B[//C & //$\alpha$].

All five patterns contain a variable that allow us to study queries with different properties. In pattern P1, the variable $\delta$ can be replaced with a path expression, such as "//a//b//c", or null. Varying $\delta$ allows us to study path queries of varying depths. In patterns P2 through P5, the variable a can be replaced with any single tag. Recall that different tags in our third dataset have varying frequencies. By comparing across tags with varying frequencies, we can study path and twig patterns where branches have varying selectivities. In particular, in each of the patterns, we will replace a by the tags D, E, F and G. Notice also that the placement of a within the query expression is important: a query with a selective join at the "top" of the expression has different properties from a query with a selective join at the "bottom."

FIGS. 8 to 13 show the performance of each of the query patterns over our third data set, in terms of both running time and number of elements scanned.

Figure 8:
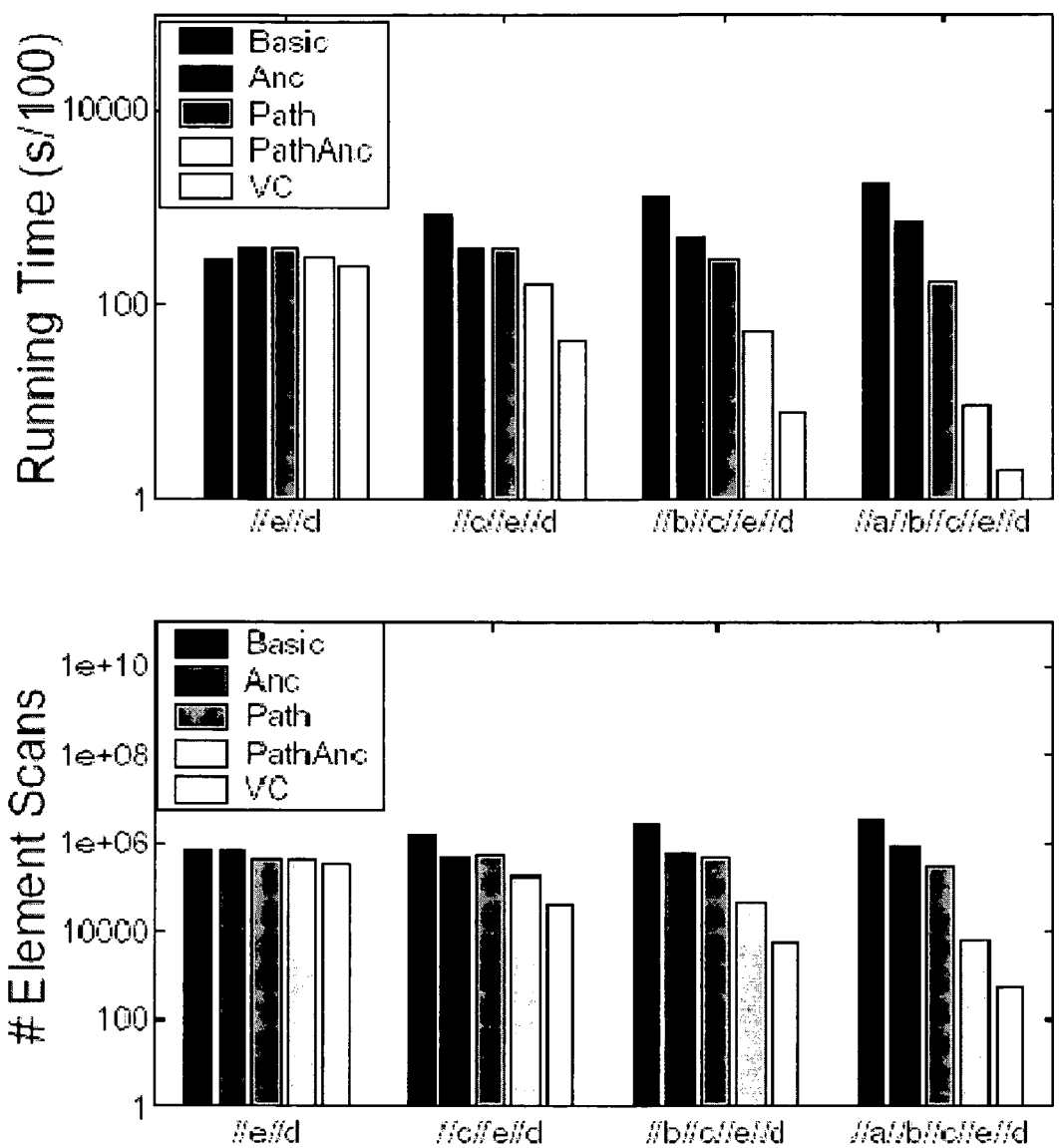
FIG. 8 is a diagram of query performance in terms of running time and number of elements scanned, according to an embodiment of the present invention.

Path Queries First consider FIG. 8. Across the x-axis, we vary the value of $\delta$ (in the figure we show the full query expression). As the depth of the query increases, two contrasting factors come into play: First, fewer elements of a given tag are useful, so there is greater potential for skipping useless elements. On the other hand, the number of internal query nodes increases, which increases the number of element sets we must handle.

We observe from FIG. 8 that the relative advantage of virtual cursors increases as the depth of the query increases. For example, virtual cursors scan half the elements as PathAnc for query "//e//d", but a whole order of magnitude fewer elements for query "//a//b//c//e//d". The reason behind this observation is the following: As we observed earlier, virtual cursors allow us to completely eliminate scans and I/Os pertaining to ancestor elements. Since deeper queries result in a larger number of ancestor element sets, virtual cursors provide a larger relative benefit for deep queries.

Note that for query "//a//b//c//e//d," the running time of virtual cursors increases slightly relative to PathAnc. The reason is that as the query becomes deeper, the overhead of the join algorithm itself increases; therefore, the savings in I/O and element scans afforded by virtual cursors are less apparent, though still significant.

Figure 9:
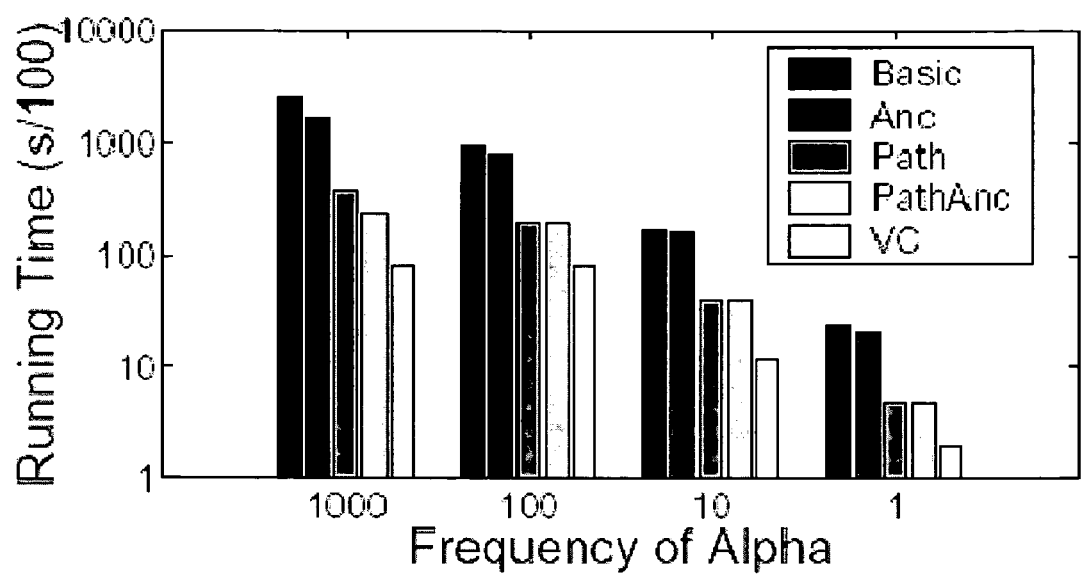
FIG. 9 is a diagram of query performance indicating that virtual cursors provide a substantial improvement across all selectivities, according to an embodiment of the present invention.
Figure 9:
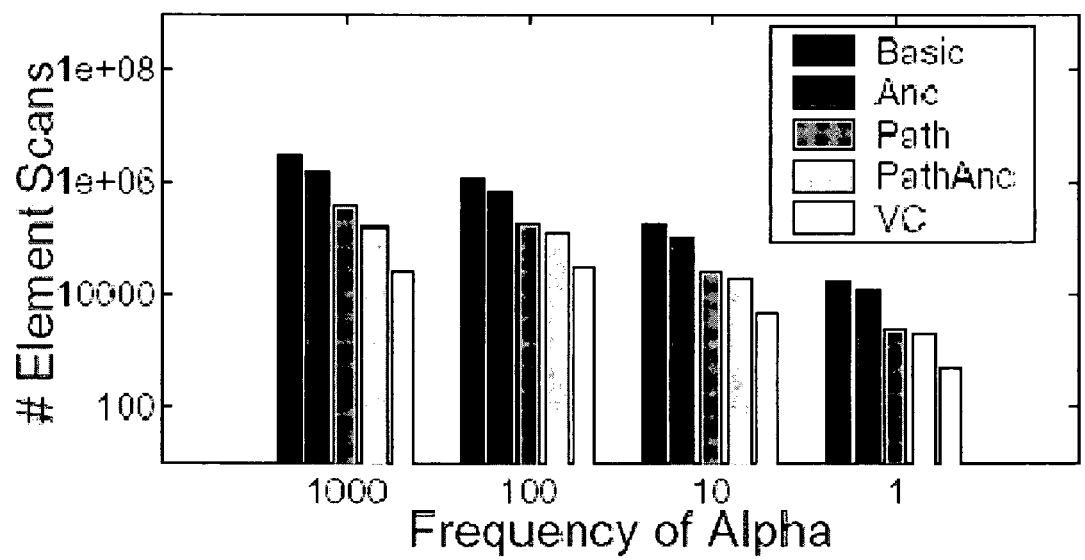

Now consider path queries of fixed depth, as we vary the selectivity of the joins. In both FIGS. 9 and 11, we vary the selectivities of the top and bottom joins in the path expression, respectively, by varying the tag $\alpha$. We show the relative frequency of $\alpha$, which is proportional to the size of the join result (e.g., $\alpha \rightarrow A$), along the x-axis. In FIG. 9, we see virtual cursors afford roughly a factor of 4 speedup across all selectivities. Thus, when the top join selectivity is varied, the effectiveness of virtual cursors, while significant, is mostly unaffected. However, when we increase the selectivity of the bottom join result (by decreasing the frequency of $\alpha$) in FIG. 11, the impact of virtual cursors increases. For example, when the relative frequency of $\alpha$ is 1000, virtual cursors provide a speedup factor of 3 over PathAnc, but when relative frequency of $\alpha$ is 10, virtual cursors provide a speedup factor of over 50. The explanation is as follows: as the result size of the bottom join decreases, the number of leaf element scans decreases with respect to the total number of scans. Since virtual cursors only scan leaf elements, its relative performance improves as the result sizes of bottom joins decrease.

Figure 12:
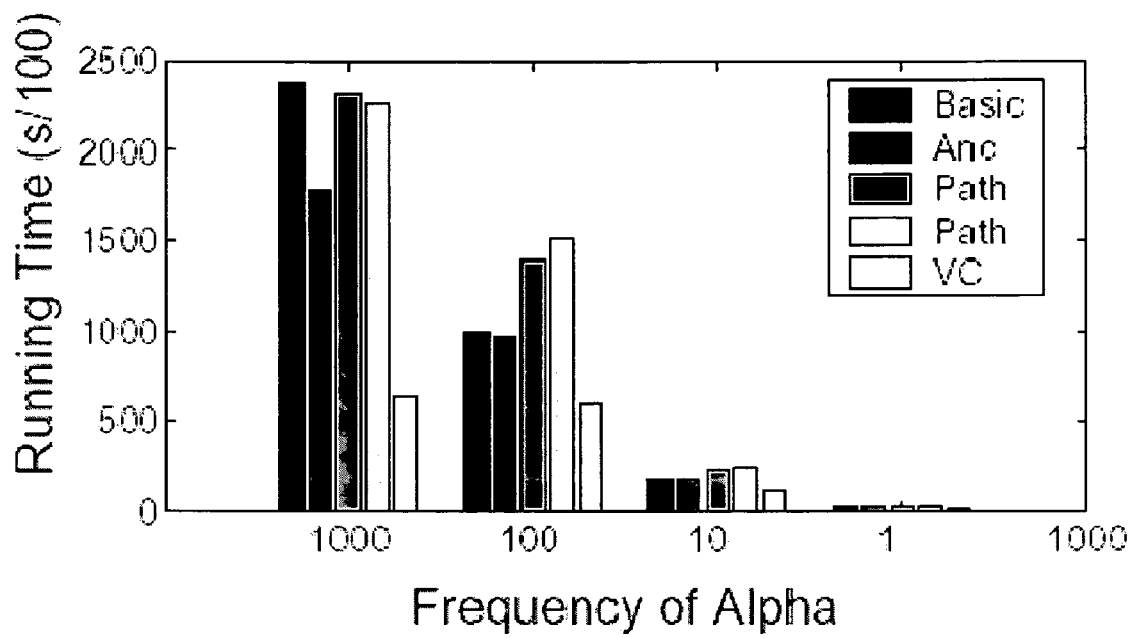
FIG. 12 is a diagram of holistic twig query performance for varying top join selectivity, according to an embodiment of the present invention.
Figure 12:
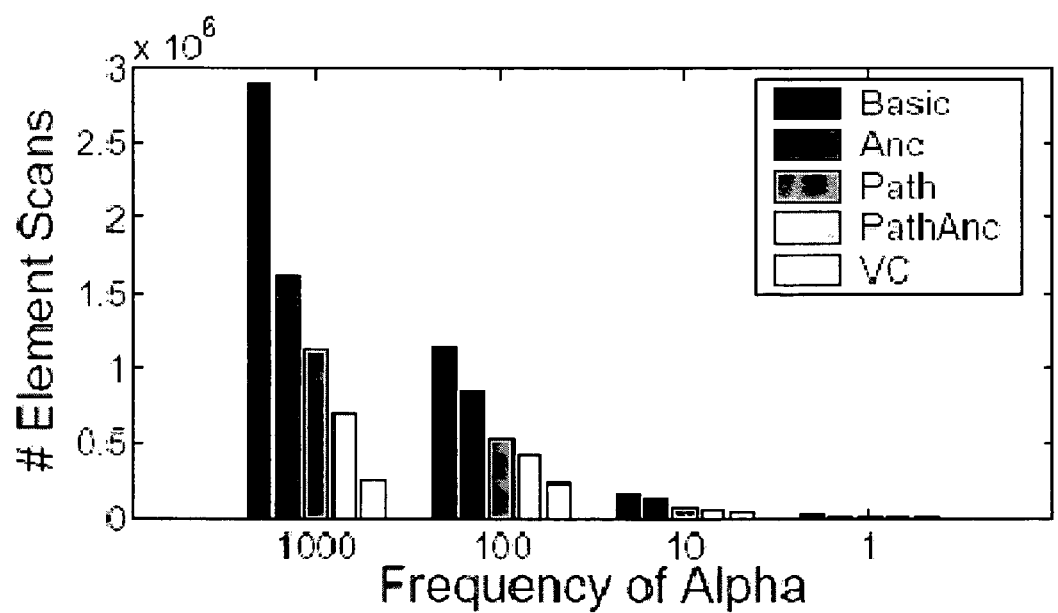
Figure 13:
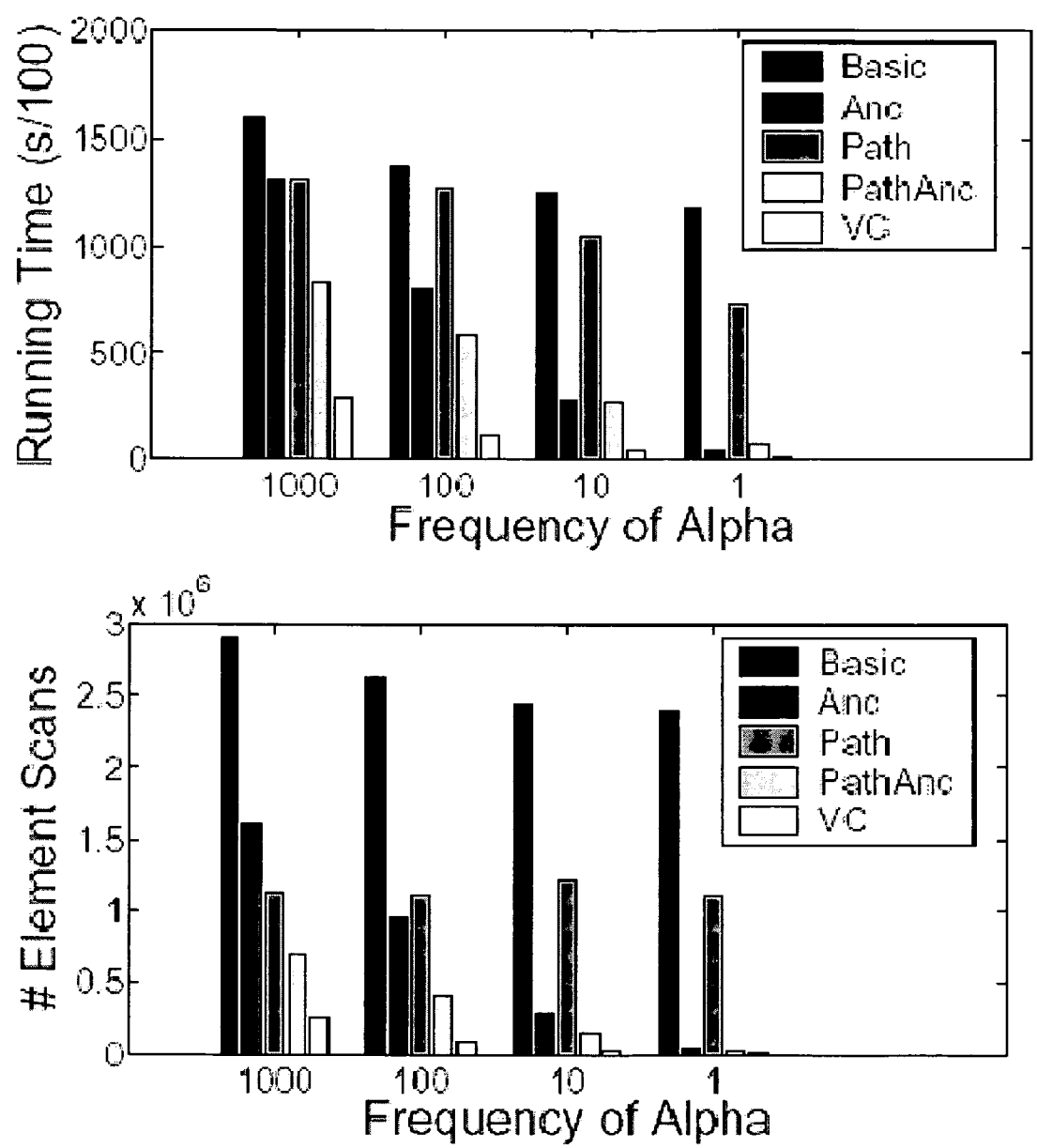
FIG. 13 is a diagram of holistic twig query performance for varying bottom join selectivity, according to an embodiment of the present invention.

Twig Queries Now let us consider holistic twig queries in FIGS. 12 and 13. At the high level, we see similar behavior to that observed for path queries: the advantage of virtual cursors remains largely unaffected when top selectivity is varied (FIG. 12), but increases as bottom selectivity increases (FIG. 13). For example, in FIG. 13, when the relative frequency of $\alpha$ is 1000, virtual cursors provide a speedup factor of 3, while when the relative frequency is 10, virtual cursors provide a speedup of 6.

Figure 11:
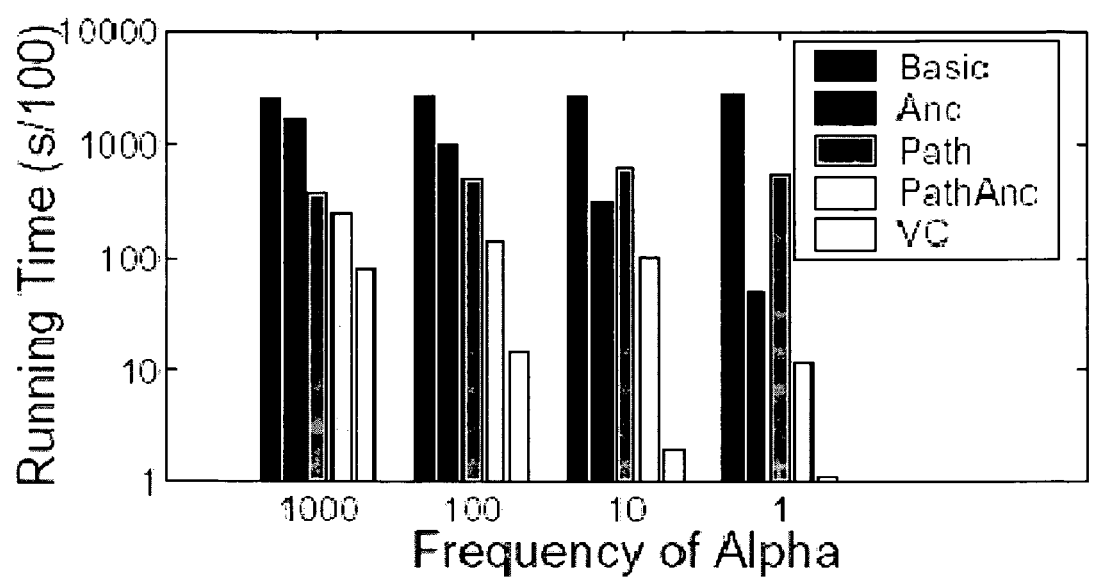
FIG. 11 is a diagram of query performance for varying bottom join result selectivity, according to an embodiment of the present invention.
Figure 11:
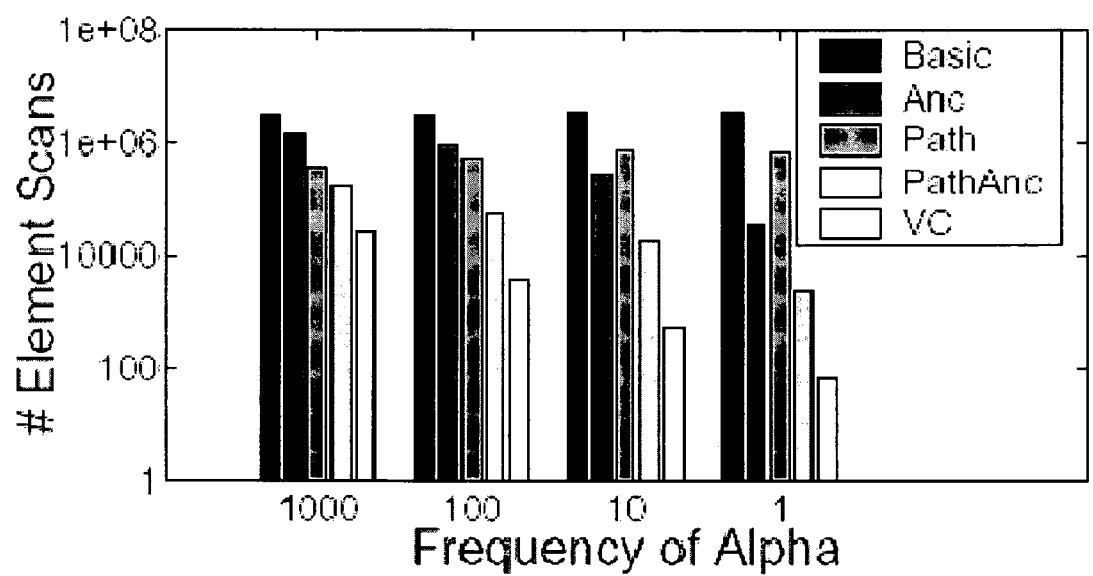

We note that speedup factor observed for twig queries in FIG. 13 is not has high as it is for path queries in FIG. 11. The explanation is that in query pattern P5, we are only varying the selectivity of one of the branches. Because the other branch remains highly unselective, overall query performance cannot improve by the same factor as with path queries.

The reason we only varied one of the branches is to point out a special case in which Anc performs exceptionally well. When at least one branch of a twig query is highly selective, the major benefit of skipping elements comes from ancestor skipping. In contrast, Path is barely more helpful in skipping descendant elements than Basic. As a result, as selectivity increases in FIG. 13 (frequency of $\alpha$ decreases), the number of element scans performed by Anc approaches that of PathAnc. Since Anc is more "lightweight", in that it packs more postings into a page, it actually has better running time than PathAnc. However, we note that virtual cursors still outperform Anc by at least a factor of 3. (Although the ViST executable could not be obtained for comparison, from the numbers presented in [21], the invention outperforms ViST by a factor of 33 in query runtime and 30-40 in build time, though our index size is roughly 5 times larger. The invention can also be used in conjunction with the twig join algorithm of [14], and it greatly speeds up its execution time.)

In summary, we have the following result characterizing the performance of virtual cursors:

RESULT 2. The virtual cursor algorithm consistently and significantly improves the runtime performance of structural joins in almost every scenario, and especially when queries are deep and/or lower joins are selective.

6.3 Overhead of Index Features

While the previous two sections have clearly demonstrated the dominant performance of virtual cursors, it is still unclear as to what the overhead is for the index features—path indices and ancestor information—that enable virtual cursors. In this section, we will explore this overhead, and the tradeoffs with virtual cursor performance.

6.3.1 Path Indices

The overhead of path indices are two-fold: the path index itself, and the integration of path IDs into the inverted index. The worst-case overhead for path indices occurs when there exist a large number of distinct paths in the dataset. In such a scenario, the path index itself can grow to the size of dataset (e.g., if all paths are unique), and the process of identifying qualifying path IDs can become expensive.

The size and build cost of path indices have been studied numerous times (e.g., [9, 18]). It is true that in the worst case where every path in the dataset is unique, a path index adds tremendous overhead; however, a more useful question is: is the overhead acceptable in a reasonable class of applications?

For the Trevi intranet search engine, our target application is a text-centric dataset. Text-centric datasets, such as XMark, tend to have simple structure; as a result, the path index is small and efficient to build and use. For example, a 1 GB XMark dataset results in a Basic uncompressed inverted index of size 4.05 GB, while the path index is only 68 KB. Likewise, the time to build the path index is negligible compared to the time to build the inverted index. A larger overhead comes from integrating path IDs into the inverted index—these increase the size and build time of the XMark database by roughly 10%. Nevertheless, these "static" costs are relatively minor given the query runtime performance benefits observed in the previous section.

In addition, even more complex datasets still result in reasonable path indices. For example, our default synthetic dataset has over 3000 distinct paths—much larger than we would expect in any dataset with a complex DTD. Yet the size and build time of the path index is still less than 1% of the size of build time of the inverted index. In our runtime experiments, the time to identify qualifying PIDs never exceeds 5% the total cost of processing a query, and even this small cost can be eliminated by pre-processing the qualifying path IDs as described in Section 4.1.

Because we expect 3000 to be an upper limit for many reasonable applications (though certainly, not all applications), and because the major runtime cost can be eliminated by pre-processing, we do not believe the path index to pose significant overhead issues.

6.3.2 Ancestor Information

There are many advantages of BEL encoding over Dewey encoding. Most importantly, BEL is a more compact encoding, and as a result, fewer I/Os may be necessary to process queries. In particular, as the depth of the dataset increases, the overhead of storing Dewey increases proportionally, whereas the overhead for storing BEL remains constant. (Overhead of BEL may be affected, for example, depending on how elements are compressed. Larger values tend not to compress as well.) Since there is no bound on the depth of an XML document, the overhead of Dewey can become arbitrarily bad. Again, however, our question is whether the overhead is acceptable in a reasonable class of applications.

To study the overhead of Dewey encoding, we will compare the performance of each of the four feature sets—Basic, Anc, Path, and PathAnc—as the depth of the dataset increases. We will use the default synthetic dataset, but artificially pad elements with a number of "junk" ancestors. By controlling the depth of the padding, we can control the overall depth of the dataset. We then compare the performance of index size, index build, and query runtime across feature sets, and across dataset depths. The average and maximum depths of these datasets are shown in Table 2. Dataset A represents the typical depth characteristics of a text-centric dataset. For reference, we include the 1 GB XMark dataset as well.

TABLE 2

Average and maximum depths for datasets

| Name | Average depth | Maximum depth |
|---|---|---|
| Dataset A | 7.7 | 16 |
| Dataset B | 16.4 | 37 |
| Dataset C | 30.8 | 62 |
| Dataset D | 59.2 | 122 |
| XMark | 9.1 | 13 |

Compression In the worst case, when Dewey encoding is not compressed (e.g., a fixed number of bytes is used to represent each component in the address), the size of the encoding for a given element will increase linearly with its depth. Luckily, there are many proposed techniques for compressing Dewey, such as [20]. The compression scheme in [20] not only represents Dewey elements in almost an order of magnitude fewer bytes as the uncompressed scheme, but it also allows faster comparisons of Dewey-encoded elements as single numeric values. While individual values in BEL encoding may also be compressed, the potential for compression is much higher with Dewey encoding.

However, it is impossible to fit a comprehensive performance comparison of all possible compression schemes for Dewey encoding within the scope of this paper. Instead, we have chosen to study uncompressed indices as the worst-case scenario for Dewey encoding. The motivation is that if we can show that uncompressed Dewey encoding has an acceptable overhead, then intelligent compression schemes can only further improve performance.

Index Size and Build Time Table 3 shows us the sizes of the inverted index for each feature set, across the different datasets, while Table 4 shows us index build time. From these tables, we see that deeper datasets have a large impact on these "static" properties of the index. For example, the difference in index size cause by Dewey encoding (i.e., between PathAnc and Path, or Anc and Basic), is almost a factor of 4 for Dataset D, where average depth is 60 and maximum depth is 122. However, the difference in index size caused by Dewey encoding in Dataset A or XMark, which has characteristics typical of a text-centric dataset, is only 25-30%. Furthermore, we will see shortly that even for deep datasets, runtime performance is still best using virtual cursors over the PathAnc feature set.

TABLE 3

Index size (MB) over datasets without compression

| Feature Set | A | B | C | D | XMark |
|---|---|---|---|---|---|
| Basic | 32.4 | 81.0 | 161.9 | 323.7 | 4.05 GB |
| Anc (Dewey) | 40.0 | 136.5 | 396.4 | 1299.2 | 5.30 GB |
| Path (PID) | 36.6 | 91.4 | 182.8 | 365.6 | 4.59 GB |
| PathAnc (PID + Dewey) | 44.1 | 146.8 | 417.5 | 1342.5 | 5.81 GB |

TABLE 4

Index build time (s) over datasets without compression

| Feature Set | A | B | C | D | XMark |
|---|---|---|---|---|---|
| Basic | 10.3 | 27.2 | 61.6 | 130.9 | 950 |
| Anc (Dewey) | 11.6 | 34.4 | 94.6 | 349.6 | 1118 |
| Path (PID) | 12.7 | 36.4 | 83.4 | 229.4 | 1044 |
| PathAnc (PID + Dewey) | 13.8 | 42.4 | 111.9 | 319.7 | 1149 |

While we do not discuss updates in detail, existing work in this area shows that both updates on path indices [16], and updates over an Anc index using Dewey encoding [20] can be performed efficiently relative to updates over a Basic index. In many cases Dewey encoding can actually improve update efficiency. The integration of PIDs into the inverted index will also not greatly increase update costs—in fact, element insertion/deletion cost is not affected at all.

Query Runtime While the storage overhead of Dewey encoding is significant for deep datasets, the real cost of a large index is the extra I/Os necessary to process queries over the index. Hence, we may be willing to overlook storage cost, if Dewey encoding can still result in better query runtime cost. In addition, in a text-centric application where index rebuilds are infrequent, again; a large build time is acceptable if query runtime is faster.

Figure 14:
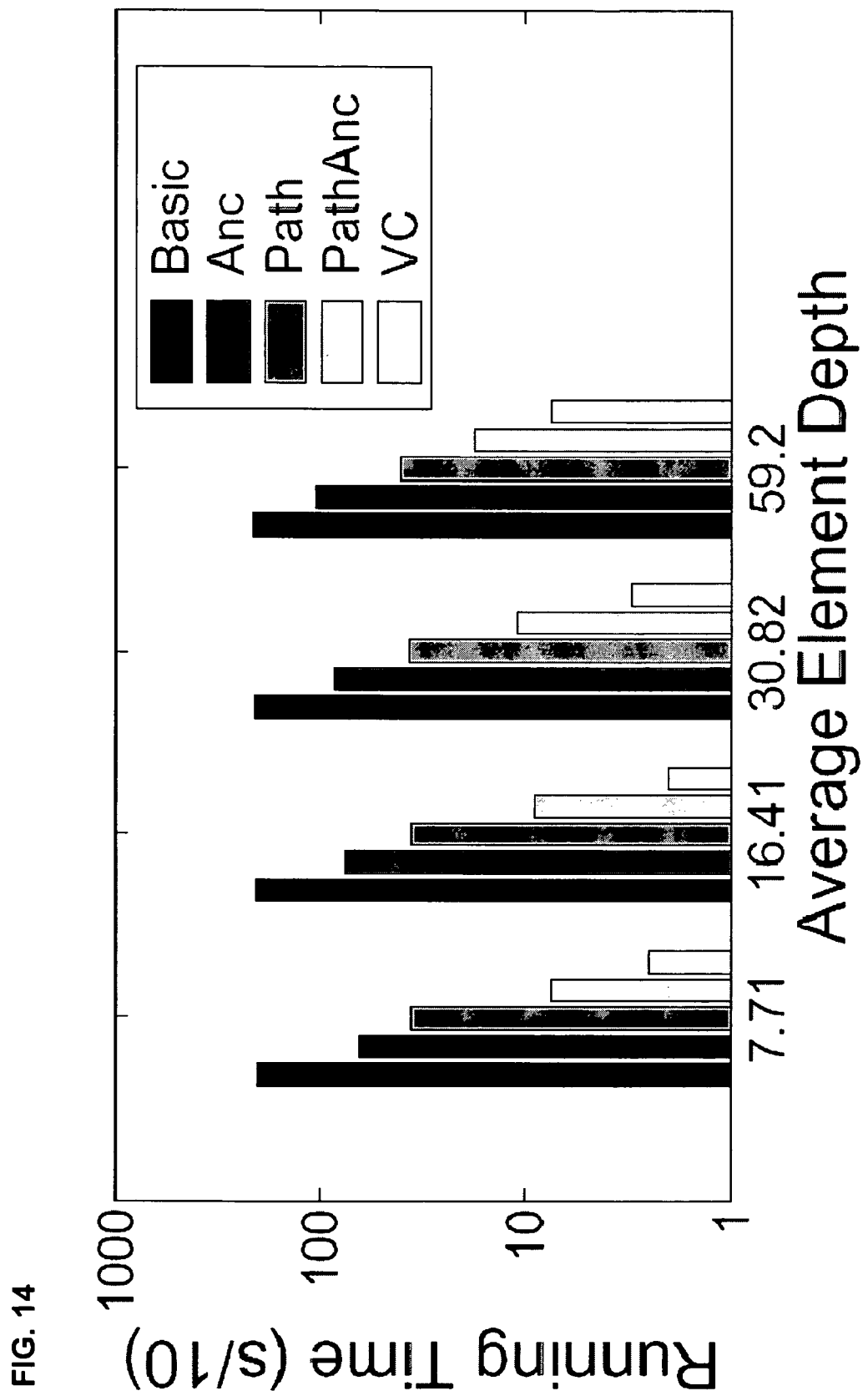
FIGS. 14-16 are diagrams of representative query performance for various datasets, according to an embodiment of the present invention.
Figure 15:
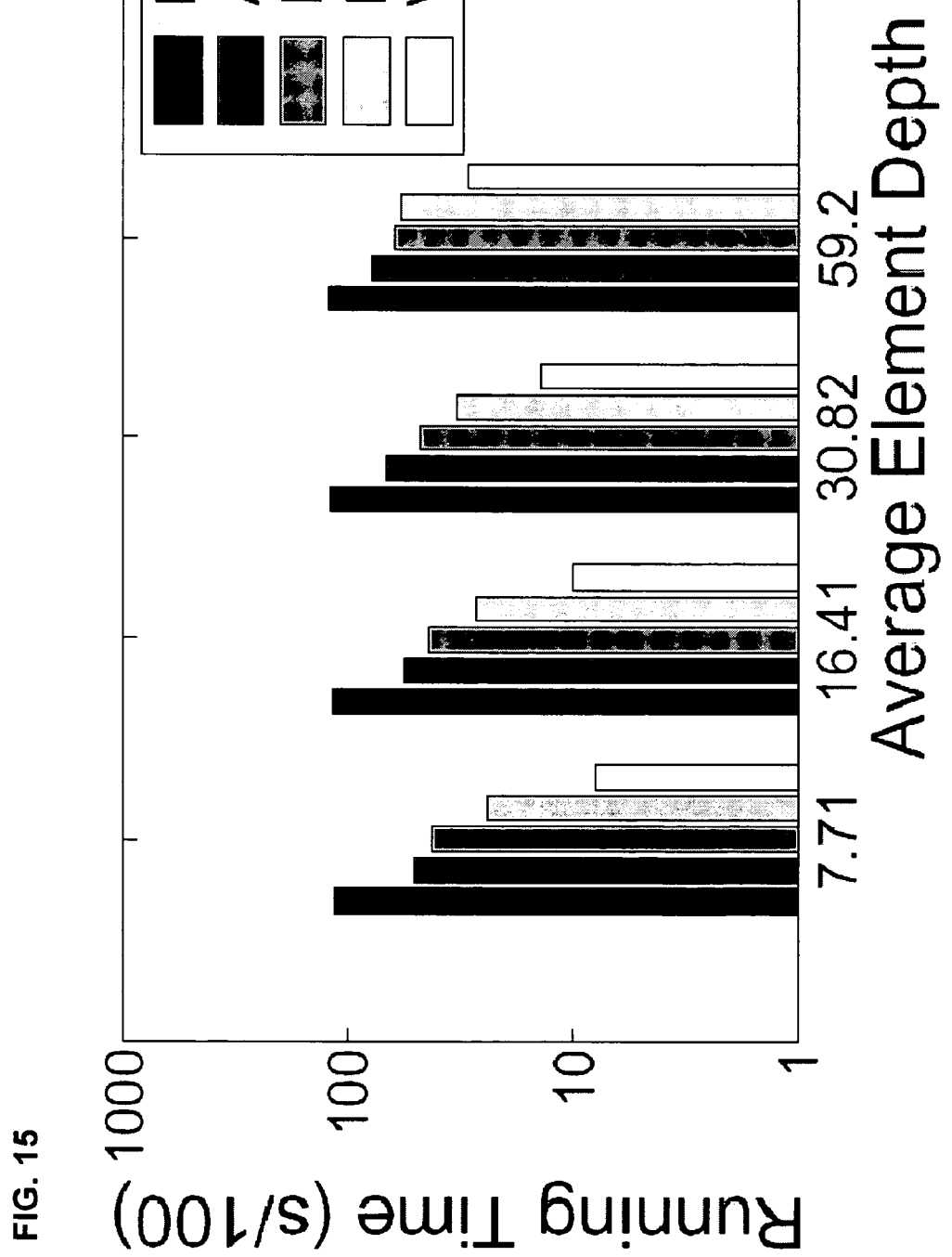
Figure 16:
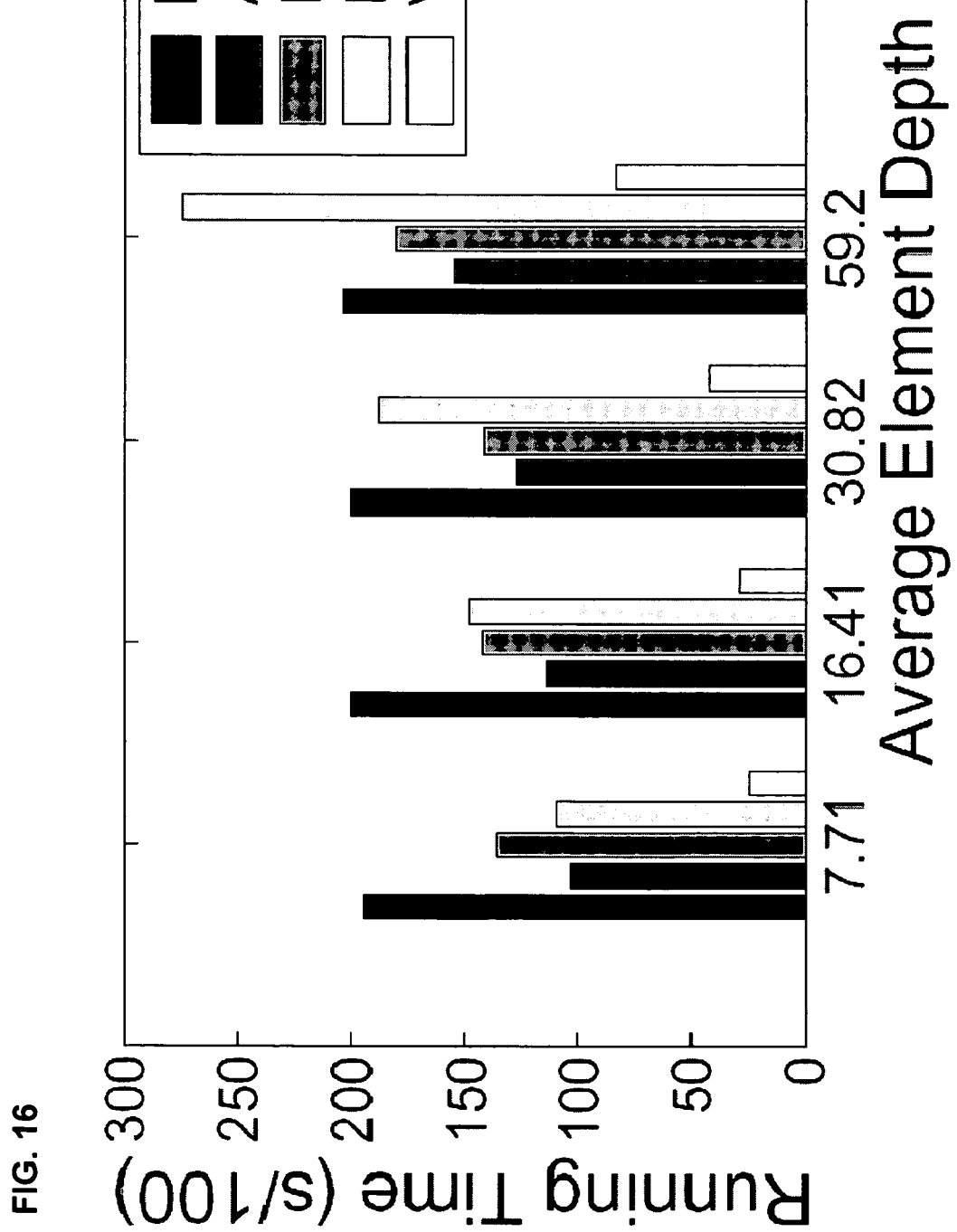

To study the effect of document depth on running time, we choose three representative queries from the previous two sections, as shown in FIGS. 14 to 16. In these figures, we vary the datasets used to process the query. The different datasets have different average element depths, which we display. Two queries are path expressions of varying depth, while the third is a twig expression. All expressions have moderate selectivity, so as not to bias the advantages of virtual cursors one way or the other.

From these figures, we find that, as expected, increasing depths degrade the running of time over the feature sets that use Dewey encoding (i.e., Anc, PathAnc, and VC). This effect is most clearly seen in FIG. 16, where PathAnc quickly becomes the worst-performing feature set, and virtual cursor performance degrades by almost a factor of 4.

However, we see that in all cases, virtual cursors still result in significantly, consistently improved running times. For example, consider the path query //B//C//E//D shown in FIG. 14. Over Dataset A, where average depth is 7.71 and maximum depth is 16, virtual cursors result in over two orders of magnitude faster running time than Basic, and are over three times faster than the next-best alternative, PathAnc. When the average element depth increases to 59, the running time of virtual cursors triples. However, it is still 30 times faster than Basic, and almost 3 times faster than PathAnc (which is also affected by dataset depth). Please refer back to FIG. 10 and the discussion in Section 6.1 for the explanation on why virtual cursors perform so well.

Again, because there is no bound on document depth, we can construct datasets in which performance of virtual cursors, which depends on ancestor information, is arbitrarily bad. However, for a large range of reasonable depths, on indices that are not compressed, we find that virtual cursors still have far superior performance over all other feature sets. Our conclusion is thus that if an application is known to have very deep datasets (e.g., average depth in the hundreds), then they should avoid using Dewey encoding. Otherwise, for the broad class of applications with document depths less than hundred, virtual cursors can speed up queries by several factors to several orders of magnitude.

A general purpose computer is programmed according to the inventive steps herein. The invention can also be embodied as an article of manufacture—a machine component—that is used by a digital processing apparatus to execute the present logic. This invention is realized in a critical machine component that causes a digital processing apparatus to perform the inventive method steps herein. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device.

While the invention has been described with respect to illustrative embodiments thereof, it will be understood that various changes may be made in the apparatus and means herein described without departing from the scope and teaching of the invention. Accordingly, the described embodiment is to be considered merely exemplary and the invention is not to be limited except as specified in the attached claims.

We claim:

1. A method for improving XML query evaluation, comprising:
   combining path indices and ancestor information to replace at least one physical index cursor with at least one virtual cursor for processing joins;
   given an element position p of a child query node, retrieving information describing ancestor positions of element position p and levels at which relevant ancestors appear; and
   finding the first ancestor position pa for which these conditions hold:
   (1) ancestor position pa>element position pcur, where pcur is the current element position of the virtual cursor, and
   (2) ancestor position pa is relevant to the virtual cursor, because ancestor position pa has an appropriate tag or text value;
   wherein the number of postings handled for a join is decreased by modifying the virtual cursors to ignore all postings with non-qualifying path IDs; and
   wherein movement of the virtual cursors never triggers index I/O operations as the need to scan postings for all internal, non-leaf posting lists is deliberately avoided.

2. The method of claim 1 further comprising:
   performing the retrieving once for a given path ID and token; and saving the retrieved information for re-use for future queries.

3. The method of claim 1 wherein the retrieved information is described using Dewey encoding.

4. The method of claim 1 further comprising:
defining a deliberately invalid cursor position to satisfy conditional constraints and to maintain join algorithm correctness if no ancestor exists for a given element position.

5. A computer program product for improving XML query evaluation, the computer program product comprising:
a computer readable storage medium having computer readable program code embodied therewith, the computer readable program code comprising computer readable program code configured to:
combine path indices and ancestor information to replace at least one physical index cursor with at least one virtual cursor for processing joins;
retrieve information, given an element position p of a child query node, the information describing ancestor positions of element position p and levels at which relevant ancestors appear; and
find the first ancestor position pa for which these conditions hold:
(1) ancestor position pa>element position pcur, where pcur is the current element position of the virtual cursor, and
(2) ancestor position pa is relevant to the virtual cursor, because ancestor position pa has an appropriate tag or text value;
wherein the number of postings handled for a join is decreased by modifying the virtual cursors to ignore all postings with non-qualifying path IDs; and
wherein movement of the virtual cursors never triggers index I/O operations as the need to scan postings for all internal, non-leaf posting lists is deliberately avoided.

6. The computer program product of claim 5 further comprising computer readable program code configured to perform the retrieving once for a given path ID and token; and saving the retrieved information for re-use for future queries.

7. The computer program product of claim 5 wherein the retrieved information is described using Dewey encoding.

8. The computer program product of claim 5 further comprising computer readable program code configured to define a deliberately invalid cursor position to satisfy conditional constraints and to maintain join algorithm correctness if no ancestor exists for a given element position.

9. A system, comprising:
at least one processor; and
at least one memory unit which stores instructions operable with the at least one processor for improving XML query evaluation, the instructions being executed for:
combining path indices and ancestor information to replace at least one physical index cursor with at least one virtual cursor for processing joins;
given an element position p of a child query node, retrieving information describing ancestor positions of element position p and levels at which relevant ancestors appear; and
finding the first ancestor position pa for which these conditions hold:
(1) ancestor position pa>element position pcur, where pcur is the current element position of the virtual cursor, and
(2) ancestor position pa is relevant to the virtual cursor, because ancestor position pa has an appropriate tag or text value;
wherein the number of postings handled for a join is decreased by modifying the virtual cursors to ignore all postings with non-qualifying path IDs; and
wherein movement of the virtual cursors never triggers index I/O operations as the need to scan postings for all internal, non-leaf posting lists is deliberately avoided.

10. The system of claim 9, further comprising instructions being executed for:
performing the retrieving once for a given path ID and token; and
saving the retrieved information for re-use for future queries.

11. The system of claim 9, wherein the retrieved information is described using Dewey encoding.

12. The system of claim 9, further comprising instructions being executed for:
defining a deliberately invalid cursor position to satisfy conditional constraints and to maintain join algorithm correctness if no ancestor exists for a given element position.

* * * * *